US012444111B2

(12) United States Patent
Kim et al.

(10) Patent No.: US 12,444,111 B2
(45) Date of Patent: Oct. 14, 2025

(54) ELECTRONIC DEVICE AND METHOD FOR PROVIDING NOTIFICATION INFORMATION BASED ON GAZE OF USER

(71) Applicant: Samsung Electronics Co., Ltd., Gyeonggi-do (KR)

(72) Inventors: Suhyun Kim, Gyeonggi-do (KR); Dongil Son, Gyeonggi-do (KR); Dohyoung Kim, Gyeonggi-do (KR); Hyeongseok Kim, Gyeonggi-do (KR); Gyujin Lee, Gyeonggi-do (KR); Seungjoon Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/617,976

(22) Filed: Mar. 27, 2024

(65) Prior Publication Data

US 2025/0014247 A1      Jan. 9, 2025

Related U.S. Application Data

(63) Continuation of application No. PCT/KR2024/003409, filed on Mar. 19, 2024.

(30) Foreign Application Priority Data

Jul. 6, 2023   (KR) .......................... 10-2023-0088016
Jul. 27, 2023  (KR) .......................... 10-2023-0098252

(51) Int. Cl.
*G06F 3/01*     (2006.01)
*G06F 3/16*     (2006.01)
(Continued)

(52) U.S. Cl.
CPC .............. *G06T 11/60* (2013.01); *G06F 3/013* (2013.01); *G06F 3/16* (2013.01); *G06V 20/20* (2022.01); *G06V 40/28* (2022.01); *G06T 2200/24* (2013.01)

(58) Field of Classification Search
CPC ..... G06T 11/60; G06T 2200/24; G06F 3/013; G06F 3/16; G06F 3/011; G06F 3/017; G06F 3/167; G06V 20/20; G06V 40/28
See application file for complete search history.

(56) References Cited

U.S. PATENT DOCUMENTS 9,761,057 B2   9/2017  Salter et al.
9,864,910 B2   1/2018  Mullins et al.
(Continued)

FOREIGN PATENT DOCUMENTS

JP    7139394 B2       9/2022
JP    2022-164671 A   10/2022
(Continued)

OTHER PUBLICATIONS

International Search Report dated Jul. 3, 2024.
Written Opinion dated Jul. 3, 2024.

*Primary Examiner* — Pegeman Karimi
(74) *Attorney, Agent, or Firm* — Cha & Reiter, LLC.

(57) ABSTRACT

A wearable device comprises a display, a sensor, a communication circuit, memory comprising instructions, and at least one processor. The instructions, when executed by the at least one processor, cause the wearable device to identify a context representing a situation of a user and a position of an object associated with the context based on information obtained through the sensor and the communication circuit, display a first visual object superimposed on a periphery of the object based on verifying that the object is positioned within a first area in a field of view (FoV) area of the wearable device, display by blinking the first visual object (Continued)

based on verifying that the object is positioned within a second area in the FoV area, and display a second visual object representing the object in the FoV area based on verifying that the object is positioned outside of the FoV area.

20 Claims, 18 Drawing Sheets

(51) Int. Cl.
    *G06T 11/60*    (2006.01)
    *G06V 20/20*    (2022.01)
    *G06V 40/20*    (2022.01)

(56) References Cited

U.S. PATENT DOCUMENTS

| | | | |
|---|---|---|---|
| 10,955,914 B2* | 3/2021 | Burns | G06F 3/0482 |
| 11,022,794 B2 | 6/2021 | Sztuk et al. | |
| 11,422,622 B2 | 8/2022 | Jeong et al. | |
| 11,579,683 B2 | 2/2023 | Yoon | |
| 11,715,273 B2 | 8/2023 | Lee et al. | |
| 11,877,051 B2 | 1/2024 | Inagaki | |
| 11,927,756 B2 | 3/2024 | Jeong et al. | |
| 11,996,067 B2 | 5/2024 | Uhm et al. | |
| 2013/0050258 A1* | 2/2013 | Liu | G06F 3/013 |
| | | | 345/633 |
| 2014/0362111 A1 | 12/2014 | Kim | |
| 2017/0131764 A1* | 5/2017 | Bognar | G06F 3/0484 |
| 2021/0233315 A1* | 7/2021 | Jung | G06V 20/20 |
| 2022/0099973 A1* | 3/2022 | Goodrich | G02B 27/0149 |
| 2022/0244776 A1 | 8/2022 | Naples et al. | |
| 2023/0141588 A1 | 5/2023 | Nagel | |
| 2023/0222744 A1 | 7/2023 | Uhm et al. | |
| 2024/0045562 A1 | 2/2024 | Dryer et al. | |

FOREIGN PATENT DOCUMENTS

| | | |
|---|---|---|
| JP | 2022-171056 A | 11/2022 |
| KR | 10-2014-0143505 A | 12/2014 |
| KR | 10-2021-0096959 A | 8/2021 |
| KR | 10-2021-0103877 A | 8/2021 |
| KR | 10-2022-0036679 A | 3/2022 |
| KR | 10-2389738 B1 | 4/2022 |
| KR | 10-2022-0082086 A | 6/2022 |
| KR | 10-2022-0120356 A | 8/2022 |
| KR | 10-2022-0136776 A | 10/2022 |
| KR | 10-2022-0165840 A | 12/2022 |

* cited by examiner

ELECTRONIC DEVICE AND METHOD FOR PROVIDING NOTIFICATION INFORMATION BASED ON GAZE OF USER

CROSS-REFERENCE TO RELATED APPLICATION(S)

This application is a continuation application, claiming priority under § 365 (c), of an International application No. PCT/KR2024/003409, filed on Mar. 19, 2024, which is based on and claims the benefit of a Korean Patent Application number 10-2023-0088016, filed on Jul. 6, 2023, in the Korean Intellectual Property Office and of a Korean Patent Application number 10-2023-0098252, filed on Jul. 27, 2023, in the Korean Intellectual Property Office, the disclosure of each of which is incorporated by reference herein in its entirety.

BACKGROUND

1. Technical Field

The following descriptions relate to an electronic device and a method for providing notification information based on a gaze of a user.

2. Background Art

An electronic device can display information generated by a computer. The information can be in connection with an external object in the real world (or a virtual object in the virtual world is being developed). The electronic device may include a wearable device. For example, the electronic device may include user equipment, Augmented (AR) glasses, Virtual Reality (VR) glasses, and/or head-mounted device (HMD) (e.g., video see through (VST) HMD, and optical see through (OST) HMD), to name a few.

SUMMARY

As described above, a wearable device may comprise a display. The wearable device may comprise a sensor. The wearable device may comprise a communication circuit. The wearable device may comprise memory, including one or more storage mediums, storing instructions. The wearable device may comprise at least one processor comprising processing circuitry. The instructions, when executed by the at least one processor individually or collectively, may cause the wearable device to, identify a context representing a situation of a user worn by the wearable device based on information obtained through the sensor and the communication circuit. The instructions, when executed by the at least one processor individually or collectively, may cause the wearable device to, identify a position of an object associated with the context based on the information. The instructions, when executed by the at least one processor individually or collectively, may cause the wearable device to, display a first visual object, which is at least partially superimposed on with respect to the object, superimposed on a periphery of the object based on verifying that the object is positioned within a first area corresponding to a gaze direction of the user in a field of view (FoV) area of the wearable device. The instructions, when executed by the at least one processor individually or collectively, may cause the wearable device to, display by blinking the first visual object which is at least partially superimposed on with respect to the object based on verifying that the object is positioned within a second area excluding the first area in the FoV area. The instructions, when executed by the at least one processor individually or collectively, may cause the wearable device to, display a second visual object representing the object on a point in the FoV area based on verifying that the object is positioned within a third area outside of the FoV area.

As described above, a vehicle may comprise a sensor. The vehicle may comprise a communication circuit. The vehicle may comprise memory, including one or more storage mediums, storing instructions. The vehicle may comprise at least one processor comprising processing circuitry. The instructions, when executed by the at least one processor individually or collectively, may cause the vehicle to receive Field of View (FoV) information of a wearable device and gaze information of the user, from the wearable device, which is connected through the communication circuit, worn by the user of the vehicle. The instructions, when executed by the at least one processor individually or collectively, may cause the vehicle to identify a Field of View (FoV) of the wearable device with respect to the gaze based on the Field of View (FoV) information and the gaze information. The instructions, when executed by the at least one processor individually or collectively, may cause the vehicle to identify a recognition area of the vehicle outside of the Field of View (FoV) based on information obtained through the sensor and the communication circuit. The instructions, when executed by the at least one processor individually or collectively, may cause the vehicle to, based on identifying an object associated with a context representing a situation of the user within the recognition area, provide notification for the object and transmit, to the wearable device, a signal indicating a display of a visual object for notifying the object.

DETAILED DESCRIPTION

The terms used in the present disclosure are used only to describe a specific embodiment and may not be intended to limit the scope of other embodiments. Singular expressions may include plural expressions unless the context clearly represents otherwise. The terms used herein, including technical or scientific terms, may have the same meaning as those generally understood by a person skilled in the technical field described in the present disclosure. Among the terms used in the present disclosure, terms defined in general dictionary may be interpreted in the same or similar meaning as they have in the context of related technology and are not interpreted in an ideal or excessively formal sense unless explicitly defined in the present disclosure. In some cases, even the term defined in the present disclosure may not be interpreted to exclude embodiments of the present disclosure.

In one or more embodiments of the present disclosure described below, a hardware approach will be described as an example. However, since one or more embodiments of the present disclosure include technology that uses both hardware and software, one or more embodiments of the present disclosure do not exclude software-based approach.

In addition, in the present disclosure, the term 'greater than' or 'less than' may be used to determine whether a particular condition is satisfied or fulfilled, but this is only a description to express an example and does not exclude description of 'more or equal to' or 'less or equal to'. Conditions described as 'greater than or equal to' may be replaced with 'greater than', conditions described as 'less than or equal to' may be replaced with 'less than', and conditions described as 'greater than or equal to and less than' can be replaced with 'greater than and less than or equal to'. In addition, hereinafter, 'A' to 'B' means at least one of the elements from A (including A) to B (including B).

Figure 1:
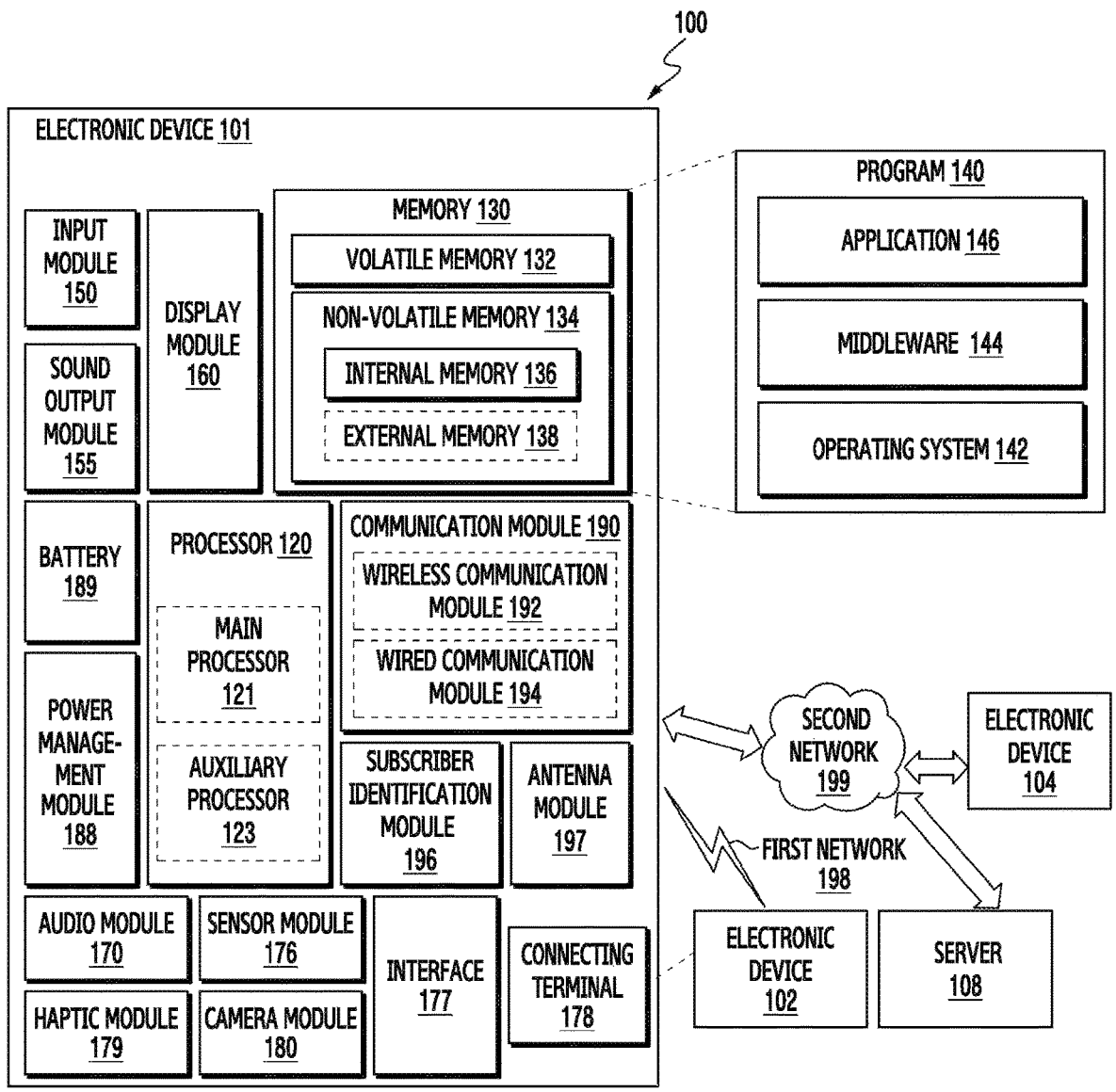
FIG. 1 is a block diagram of an electronic device in a network environment according to embodiments of the disclosure.

FIG. 1 illustrates a block diagram of an electronic device in a network environment according to embodiments of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an image signal processor or a communication processor) may be implemented as part of another component (e.g., the camera module 180 or the communication module 190) functionally related to the auxiliary processor 123. The auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure. The term "processor" shall be understood to refer to both the singular and plural contexts in this document.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). The connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mm Wave band) to address, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mm Wave antenna module. The mmWave antenna module may include a printed circuit board, a RFIC disposed on a first surface (e.g., the bottom surface) of the printed circuit board, or adjacent to the first surface and capable of supporting a designated high-frequency band (e.g., the mm Wave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another example of the disclosure, the external electronic device 104 may include an internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
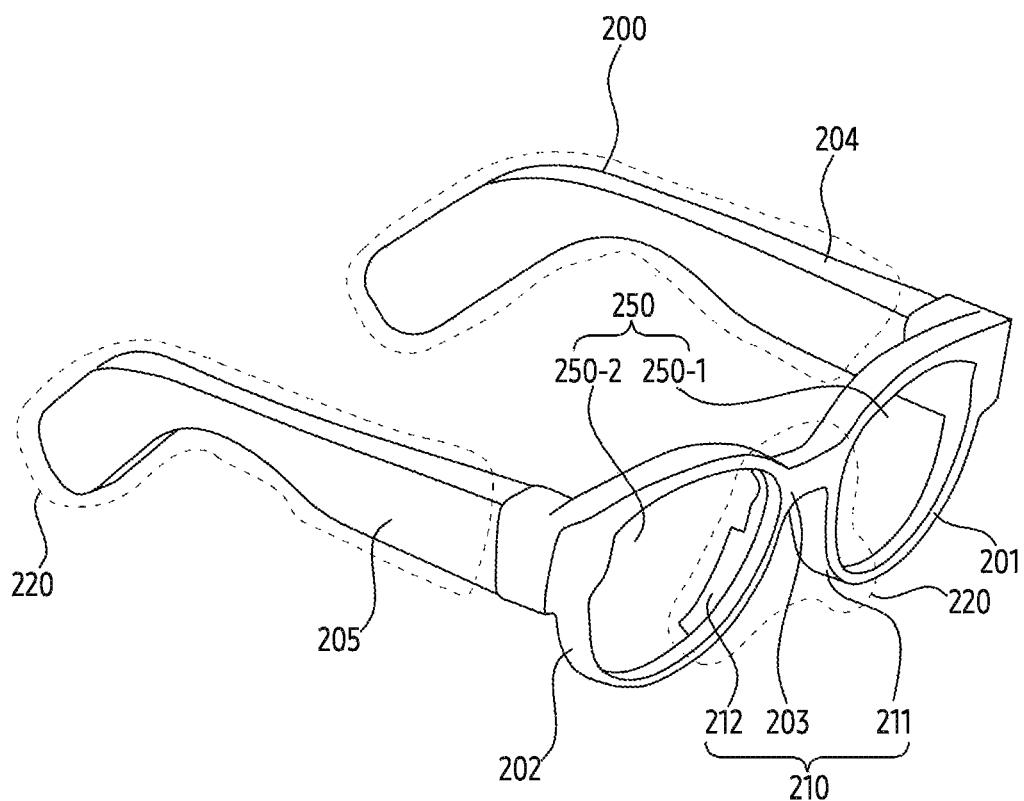
FIG. 2A illustrates an example of a perspective view of a wearable device according to embodiments of the disclosure.
Figure 2B:
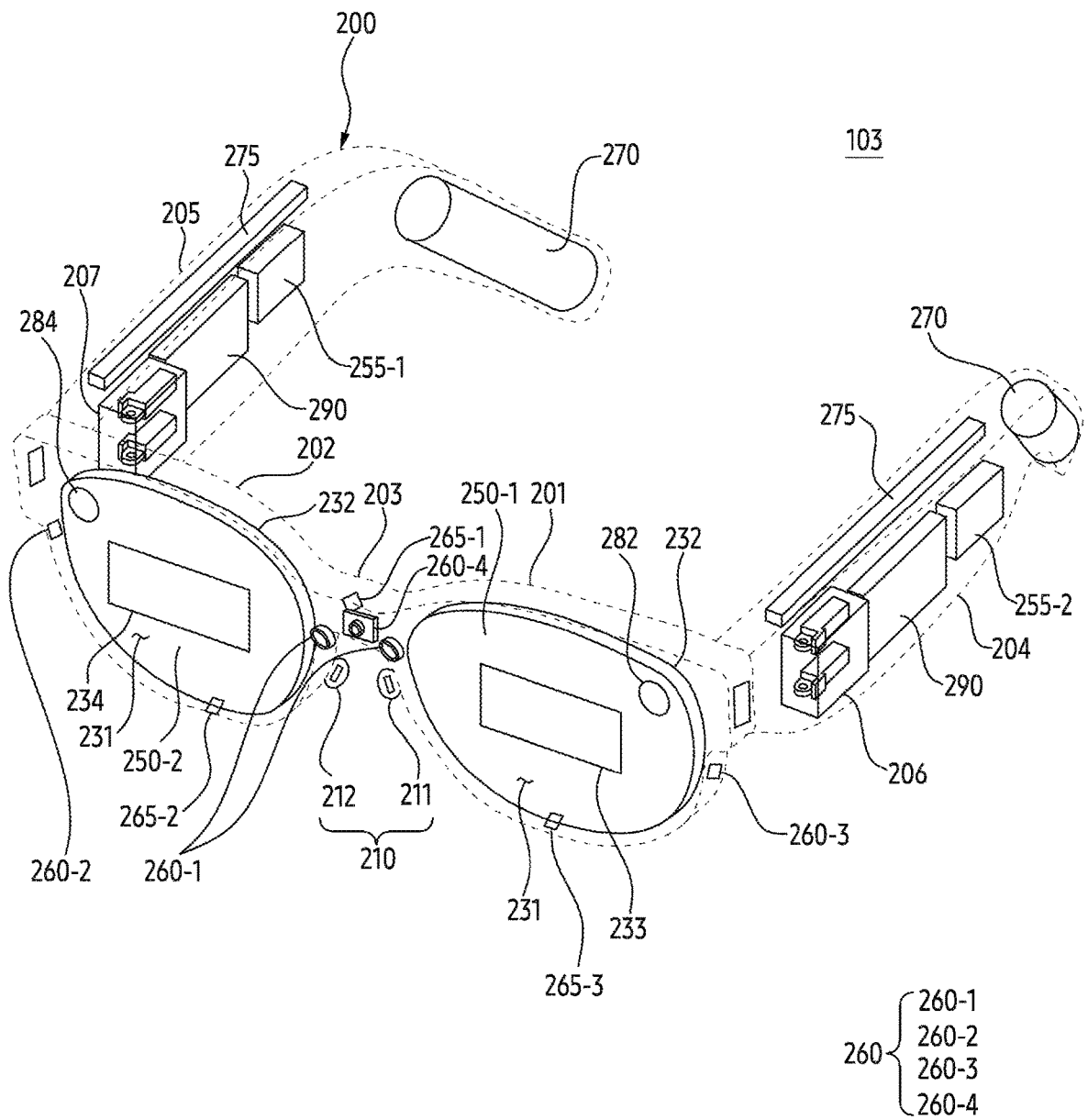
FIG. 2B illustrates an example of one or more hardware disposed in a wearable device according to embodiments of the disclosure.

FIG. 2A illustrates an example of a perspective view of a wearable device according to embodiments of the disclosure. FIG. 2B illustrates an example of one or more hardware disposed in a wearable device according to embodiments of the disclosure.

The wearable device 103 according to an embodiment may have a form of glasses wearable on a body part of user (e.g., head). The wearable device 103 of FIGS. 2A to 2B may be an example of the electronic device 101 of FIG. 1. The wearable device 103 may include a head-mounted display (HMD). For example, the housing of the wearable device 103 may include a flexible material such as rubber and/or silicon having a shape in close contact with a portion of a user's head (for example, a portion of the face covering both eyes). For example, the housing of the wearable device 103 may include one or more straps that may be able to be twined around the user's head, and/or one or more temples attachable to an ear of the head.

Referring to FIG. 2A, the wearable device 103 according to an embodiment may include at least one display 250 and a frame 200 supporting the at least one display 250.

The wearable device 103 according to an embodiment may be worn on the body part of the user. The wearable device 103 may provide extended reality (XR) to the user wearing the wearable device 103. For example, the extended reality may provide augmented reality (AR), virtual reality (VR), or mixed reality (MR) that combines augmented reality and virtual reality. For example, the wearable device 103 may display the virtual reality image provided by at least one optical device 282 and 284 of FIG. 2B on at least one display 250 in response to a designated gesture of the user obtained through a gesture recognition camera 260-2 and 263 of FIG. 2B.

According to an embodiment, at least one display 250 may provide visual information to the user. For example, the at least one display 250 may include a transparent or translucent lens. The at least one display 250 may include a first display 250-1 and/or a second display 250-2 spaced apart from the first display 250-1. For example, the first display 250-1 and the second display 250-2 may be disposed at positions corresponding to a user's left and right eyes, respectively.

Referring to FIG. 2B, the at least one display 250 may provide visual information transmitted from external light to the user through a lens included in the at least one display 250 and other visual information distinguished from the visual information. The lens may be formed based on at least one of a Fresnel lens, a pancake lens, or a multi-channel lens. For example, the at least one display 250 may include a first surface 231 and a second surface 232 opposite to the first surface 231. A display area may be formed on the second surface 232 of the at least one display 250. When the user wears a wearable device 103, external light may be incident on the first surface 231 and transmitted to the user by being transmitted through the second surface 232. For another example, the at least one display 250 may display an augmented reality image in which a virtual reality image provided by at least one optical device 282 and 284 is combined with a reality screen transmitted through external light on the display area formed on the second surface 232.

In an embodiment, the at least one display 250 may include at least one waveguide 233 and 234 that diffracts light transmitted from at least one optical device 282 and 284 and transmits it to the user. At least one waveguide 233 and 234 may be formed based on at least one of glass, plastic, or polymer. A nano pattern may be formed on at least a portion of the outside or inside of the at least one wave guide 233 and 234. The nano pattern may be formed based on a polygonal and/or a curved grating structure. Light incident to an end of the at least one waveguide 233 and 234 may propagate to another end of the at least one wave guide 233 and 234 by the nano pattern. The at least one waveguide 233 and 234 may include at least one of at least one diffractive element (e.g., a diffractive optical element (DOE), a holographic optical element (HOE)) and a reflective element (e.g., a reflective mirror). For example, the at least one waveguide 233 and 234 may be disposed within a wearable device 103 to guide a screen displayed by at least one display 250 to a user's eye. For example, the screen may be transmitted to the user's eye based on total internal reflection (TIR) generated within at least one waveguide 233 and 234.

A wearable device 103 may analyze an object included in the reality image collected through a shooting camera 260-4, combine a virtual object corresponding to the object to be provided with augmented reality among the analyzed object, and display it on at least one display 250. The virtual object may include at least one of text and image on various information associated with the object included in a real image. A wearable device 103 may analyze an object based on a multi-camera such as a stereo camera. For the object analysis, the wearable device 103 may execute spatial recognition (e.g., simultaneous localization and mapping (SLAM) by using a multi-camera and/or a time-of-flight (ToF). A user wearing the wearable device 103 may view the image displayed on at least one display 250.

According to an embodiment, a frame 200 may be made of a physical structure that allows the wearable device 103 to be worn on a body of the user. The frame 200 may be configured such that a first display 250-1 and a second display 250-2 may be positioned at a position corresponding to the user's left eye and right eye, when the user wears the wearable device 103. The frame 200 may support at least one display 250. For example, the frame 200 may support t first display 250-1 and a second display 250-2 to be positioned at the position corresponding to the user's left eye and right eye.

Referring to FIG. 2A, in case that a user wears a wearable device 103, the frame 200 may include an area 220 that at least partially contacts at least a portion of the body of the user. For example, the area 220 in contact with the body part of the user of the frame 200 may include an area in contact with a portion of a nose of the user, a portion of an ear of the user, and a portion of a side of a face of the user. The frame 200 may include a nose pad 210 contacting a portion of the body of the user. When the wearable device 103 is worn by the user, the nose pad 210 may be in contact with the portion of the nose of the user. The frame 200 may include a first temple 204 and a second temple 205 in contact with another portion of the body of the user distinguished from the portion of the body of the user.

For example, the frame 200 may include a first rim 201 surrounding at least a portion of the first display 250-1, a second rim 202 surrounding at least a portion of the second display 250-2, a bridge 203 disposed between the first rim 201 and the second rim 202, a first pad 211 disposed along a portion of a periphery of the first rim 201 from an end of the bridge 203, a second pad 211 disposed along a portion of a periphery of the second rim 202 from another end of the bridge 203, a first temple 204 extended from the first rim 201 and fixed to a portion of ear of a wearer, and a second temple 205 extended from the second rim 202 and fixed to a portion of ear opposite to the ear. The first pad 211 and the second pad 212 may contact a portion of the user's nose, and the first temple 204 and the second temple 205 may contact a portion of the user's face and a portion of the ear. The temple 204 and 205 may be rotatably connected to the rim through a hinge units 206 and 207 of FIG. 2B. The first temple 204 may be rotatably connected to the first rim 201 through the first hinge unit 206 disposed between the first rim 201 and the first temple 204. The second temple 205 may be rotatably connected to the second rim 202 through the second hinge unit 207 disposed between the second rim 202 and the second temple 205. The wearable device 103 may identify an external object (e.g., a fingertip of the user) touching the frame 200, and/or a gesture performed by the external object, by using a touch sensor, a grip sensor, and/or a proximity sensor formed on at least a portion of a surface of the frame 200.

The wearable device 103 may include hardware (e.g., hardware to be described later based on a block diagram of FIG. 5) that performs various functions. For example, the hardware may include a battery module 270, an antenna module 275, at least one optical device 282 and 284, speakers (e.g., the speakers 255-1, 255-2), a microphone (e.g., microphones 265-1, 265-2, 265-3), a light emitting module (not illustrated), and/or a printed circuit board (PCB) 290. Various hardware may be disposed within the frame 200.

The microphone (e.g., microphones 265-1, 265-2, and 265-3) of the wearable device 103 may be disposed on at least a portion of the frame 200 to obtain a sound signal. Although a first microphone 265-1 disposed on the bridge 203, a second microphone 265-2 disposed on a second rim 202, and a third microphone 265-3 disposed on a first rim 201 are illustrated in FIG. 2B, the number and disposition of the microphone 265 are not limited to an embodiment of FIG. 2B. In case that the number of microphone 265 included in the wearable device 103 is two or more, the wearable device 103 may identify a direction of the sound signal by using a plurality of microphones disposed on different portions of the frame 200.

According to an embodiment, at least one optical device 282 and 284 may project the virtual object on at least one display 250 to provide various image information to the user. For example, at least one optical device 282 and 284 may be a projector. At least one optical device 282 and 284 may be disposed adjacent to at least one display 250 or included in at least one display 250 as a portion of at least one display 250. The wearable device 103 may include a first optical device 282 corresponding to a first display 250-1 and a second optical device 284 corresponding to a second display 250-2. For example, at least one optical device 282 and 284 may include a first optical device 282 disposed at a periphery of a first display 250-1 and a second optical device 284 disposed at a periphery of a second display 250-2. A first optical device 282 may transmit light to a first waveguide 233 disposed on a first display 250-1, and a second optical device 284 may transmit light to a second waveguide 234 disposed on a second display 250-2.

In an embodiment, the camera 260 may include a shooting camera 260-4, an eye tracking camera (ET CAM) 260-1, and/or a gesture recognition camera 260-2 and 206-3. The shooting camera 260-4, the eye tracking camera 260-1, and the gesture recognition camera 260-2 and 260-3 may be disposed at different positions on the frame 200 and may perform different functions. The eye tracking camera 260-1 may output data representing a position of eye or a gaze of the user wearing the wearable device 103. For example, the wearable device 103 may detect the gaze from an image including a pupil of the user obtained through the eye tracking camera 260-1. The wearable device 103 may perform gaze interaction with at least one object by using the gaze of the user obtained through the eye tracking camera 260-1. The wearable device 103 may represent a portion corresponding to the eye of the avatar representing the user in the virtual space by using the gaze of the user obtained through the eye tracking camera 260-1. The wearable device 103 may render an image (or screen) displayed on at least one display 250 based on the position of the eye of the user. For example, the visual quality (e.g., resolution, brightness, saturation, grayscale, PPI) of a first area associated with the gaze and a second area distinguished from a first area within the image may be different. For example, in case that the wearable device 103 supports an iris recognition function, user authentication may be performed based on the iris information obtained by using the eye tracking camera 260-1. An example in which the eye tracking camera 260-1 is disposed toward the right eye of user is illustrated in FIG. 2B, but an embodiment is not limited thereto, and the eye tracking camera 260-1 may be disposed alone toward the left eye of user or toward both eyes.

In an embodiment, the shooting camera 260-4 may shoot a real image or background to be matched with a virtual image to implement augmented reality or a mixed reality content. The shooting camera 260-4 may shoot an image of the specific object existing at the position where the user is looking and provide the image to at least one display 250. At least one display 250 may display one image in which information on an actual image or background including an image of the specific object obtained by using the shooting camera 260-4 and the virtual image provided through at least one optical device 282 and 284 are overlapped. A wearable device 103 may compensate for depth information (e.g., the distance between the wearable device 103 and the external object obtained through the depth sensor) by using the image obtained through the shooting camera 260-4. The wearable device 103 may perform object recognition through an image obtained by using the shooting camera 260-4. The wearable device 103 may perform a pass through function for superimposing and displaying an image obtained through the shooting camera 260-4 while displaying the screen representing the virtual space on at least one display 250. In an embodiment, the shooting camera 260-4 may be disposed on the bridge 203 disposed between a first rim 201 and a second rim 202.

The eye tracking camera 260-1 may realize more realistic augmented reality by matching the gaze of the user with visual information provided to at least one display 250 by tracking the gaze of the user wearing the wearable device 103. For example, when the user looks at the front, the wearable device 103 may naturally display environmental information associated with the front of the user in a place where the user is positioned on at least one display 250. The eye tracking camera 260-1 may be configured to capture the image of the pupil of the user to determine the gaze of the user. For example, the eye tracking camera 260-1 may receive gaze detection light reflected from the pupil of the user and track the gaze of the user based on the position and motion of the received gaze detection light. In an embodiment, the eye tracking camera 260-1 may be disposed at the position corresponding to the user's left eye and right eye. For example, the eye tracking camera 260-1 may be disposed to face a direction in which the user wearing the wearable device 103 is positioned within a first rim 201 and/or a second rim 202.

The gesture recognition camera 260-2 and 260-3 may provide a specific event to a screen provided to at least one display 250 by recognizing the motion of all or the portion of the user's body, such as the user's torso, hand, or face. The gesture recognition camera 260-2 and 260-3 may obtain a signal corresponding to an operation by the gesture recognition of the user, and provide the display corresponding to the signal to at least one display 250. The wearable device 103 may identify the signal corresponding to the operation and perform a designated function based on the identification. The gesture recognition camera 260-2 and 260-3 may be used to perform a spatial recognition function using a SLAM and/or depth map for 6 degrees of freedom pose (6 dof pose). The wearable device 103 may perform the gesture recognition function and/or an object tracking function by using the gesture recognition camera 260-2 and 260-3. In an embodiment, the gesture recognition camera 260-2 and 260-3 may be disposed on a first rim 201 and/or a second rim 202.

The camera 260 included in the wearable device 103 is not limited to the eye tracking camera 260-1 and the gesture recognition camera 260-2 and 260-3 described above. For example, the wearable device 103 may identify the external object included in the FoV by using a camera disposed toward a FoV of user. Identification of the external object by the wearable device 103 may be performed based on a sensor for identifying a distance between the wearable device 103 and the external object, such as the depth sensor and/or the time of flight (ToF) sensor. The camera 260 disposed toward the FoV may support an autofocus function and/or an optical image stabilization (OIS) function. For example, the wearable device 103 may include the camera 260 (e.g., a face tracking (FT) camera) disposed toward the face in order to obtain the image including the face of the user wearing the wearable device 103.

Although not illustrated, the wearable device 103 according to an embodiment may further include a light source (e.g., LED) that emits light toward a subject (e.g., a user's eye, face, and/or the external object in FoV) shot by using the camera 260. The light source may include an LED having an infrared wavelength. The light source may be disposed on at least one of the frame 00 and the hinge units 206 and 207.

The battery module 270 may supply power to electronic components of the wearable device 103. In an embodiment, the battery module 270 may be disposed within a first temple 204 and/or a second temple 205. For example, the battery module 270 may be a plurality of battery modules 270. A plurality of battery modules 270 may be disposed on each of a first temple 204 and a second temple 205, respectively. In an embodiment, the battery module 270 may be disposed at the end of a first temple 204 and/or a second temple 205.

The antenna module 275 may transmit a signal or power to the outside of the wearable device 103 or may receive a signal or power from the outside. In an embodiment, the antenna module 275 may be disposed within a first temple 204 and/or a second temple 205. For example, the antenna module 275 may be disposed close to a surface of a first temple 204, and/or a second temple 205.

The Speaker 255 may output an acoustic signal to the outside of the wearable device 103. The acoustic output module may be referred to as a speaker. In an embodiment, the speaker 255 may be disposed within a first temple 204 and/or a second temple 205 to be disposed adjacent to the ear of the user wearing the wearable device 103. For example, the speaker 255 may include a second speaker 255-2 disposed adjacent to the left ear of the user by being placed within a first temple 204, and a first speaker 255-1 disposed adjacent to the right ear of the user by being placed within a second temple 205.

The light emitting module (not illustrated) may include at least one light emitting device. In order to visually provide information about a specific state of the wearable device 103 to the user, the light emitting module may emit light of a color corresponding to the specific state or light in the operation corresponding to the specific state. For example, when requiring charging, the wearable device 103 may emit red light at regular intervals. In an embodiment, the light emitting module may be disposed on a first rim 201 and/or a second rim 202.

Referring to FIG. 2B, the wearable device 103 according to an embodiment may include the printed circuit board (PCB) 290. The PCB 290 may be included in at least one of a first temple 204 and a second temple 205. The PCB 290 may include an interposer disposed between at least two sub-PCBs. On the PCB 290, one or more hardware included in the wearable device 103 (e.g., hardware illustrated by different blocks of FIG. 5) may be disposed. The wearable device 103 may include the flexible PCB (FPCB) for interconnecting the hardware.

The wearable device 103 according to an embodiment may include at least one of a gyro sensor, a gravity sensor, and/or an acceleration sensor for detecting a posture of the wearable device 103 and/or a posture of a body portion of the user (e.g., head) wearing the wearable device 103. Each of the gravity sensor and the acceleration sensor may measure gravity acceleration and/or acceleration based on designated three-dimensional axes (e.g., x-axis, y-axis, and z-axis) perpendicular to each other. The gyro sensor may measure the angular velocity of each of the designated 3D axes (e.g., x-axis, y-axis, and z-axis). At least one of the gravity sensor, the acceleration sensor, and the gyro sensor may be referred to as an inertial measurement unit (IMU). A wearable device 103 according to an embodiment may identify the user's motion and/or gesture performed to execute or stop a specific function of the wearable device 103 based on the IMU.

Figure 3A:
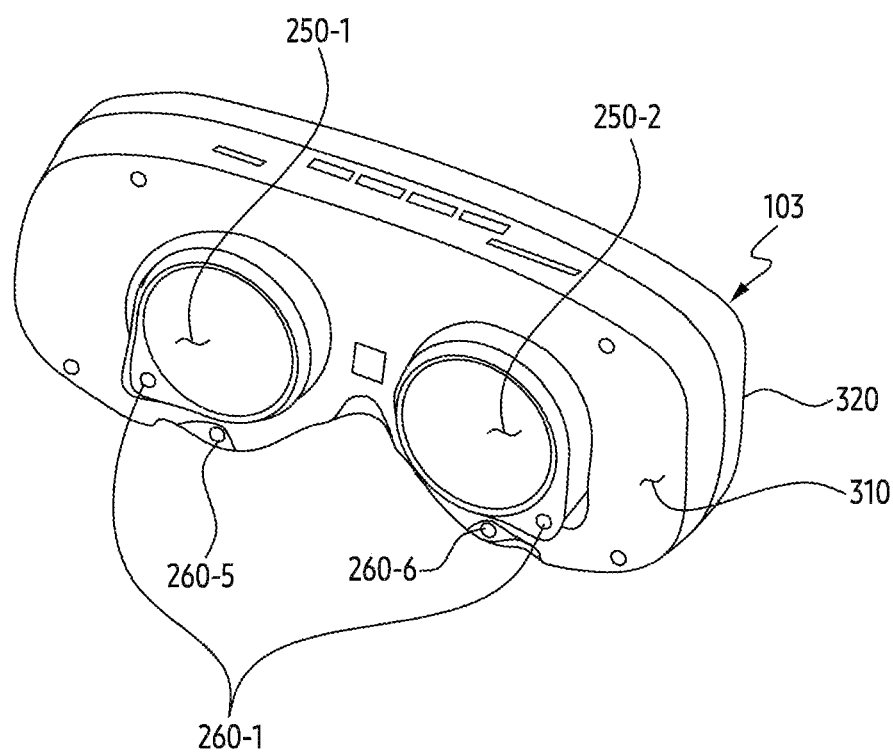
FIGS. 3A and 3B illustrate an example of the appearance of a wearable device according to embodiments of the disclosure.
Figure 3B:
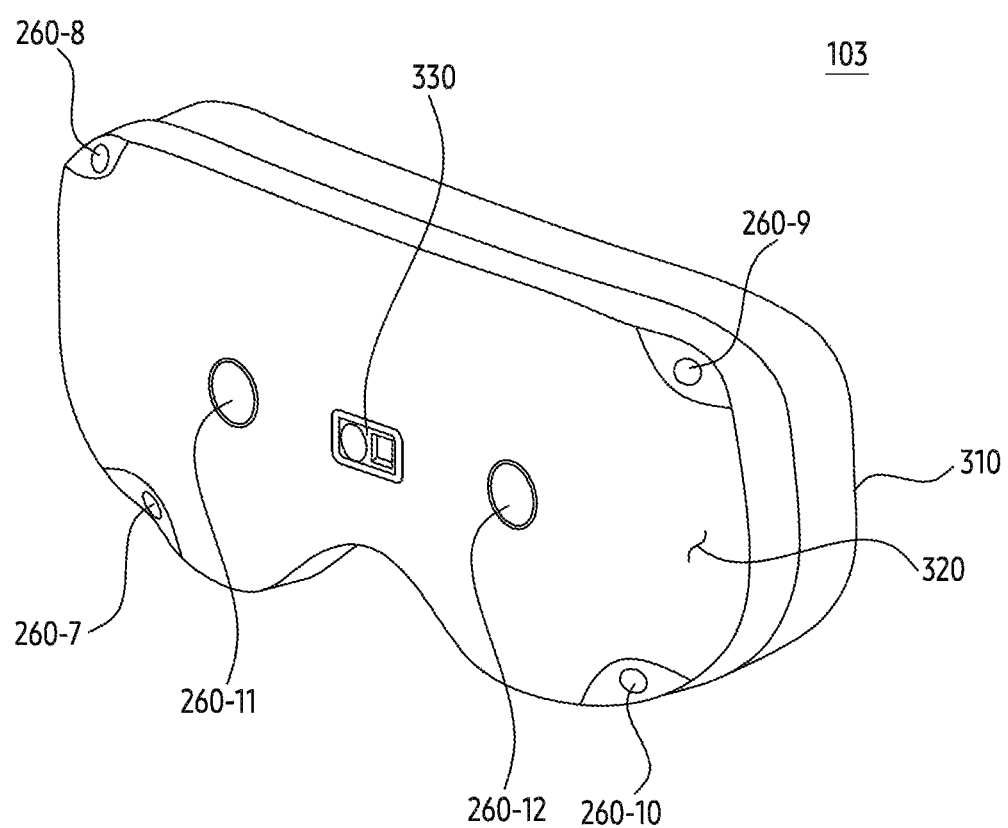

FIGS. 3A and 3B illustrate an example of the appearance of a wearable device according to embodiments of the disclosure.

The wearable device 103 of FIGS. 3A to 3B may be an example of an electronic device 101 of FIG. 1. According to an embodiment, an example of exterior of a first surface 310 of a housing of the wearable device 103 is illustrated in FIG. 3A, and an example of the exterior of a second surface 320 opposite of the first surface 310 may be illustrated in FIG. 3B.

Referring to FIG. 3A, a first surface 310 of the wearable device 103 according to an embodiment may have a form attachable to a body portion (e.g., a face of the user) of the user. Although not illustrated, the wearable device 103 may further include a strap and/or one or more temples (e.g., a first temple 204 and/or a second temple 205 in FIGS. 2A to 2B) for fixing on the body portion of the user. A first display 250-1 for outputting an image to a left cyc among both eyes of the user, and a second display 250-2 for outputting an image to a right eye among both eyes may be disposed on the first surface 310. The wearable device 103 may further include rubber or silicon packing for preventing interference by light (e.g., ambient light) different from light emitted from a first display 250-1 and a second display 250-2, formed on the first surface 310.

The wearable device 103 may include cameras 260-1 for shooting and/or tracking both eyes of a user adjacent to each of a first display 250-1 and a second display 250-2. The cameras 260-1 may be referred to an eye tracking camera 260-1 of FIG. 2B. The wearable device 103 may include cameras 260-5 and 260-6 for shooting and/or recognizing the face of the user. The cameras 260-5 and 260-6 may be referred to as a FT camera. The wearable device 103 may control an avatar representing the user in a virtual space based on a motion of the face of the user identified using the cameras 260-5 and 260-6.

Referring to FIG. 3B, a camera (e.g., cameras 260-7, 260-8, 260-9, 260-10, 260-11, 260-12) and/or a sensor (e.g., a depth sensor 330) for obtaining information associated with an external environment of the wearable device 103 may be disposed on a second surface 320 opposite to a first surface 310 of FIG. 3A. For example, cameras 260-7, 260-8, 260-9, and 260-10 may be disposed on a second surface 320 to recognize an external object. Cameras 260-7, 260-8, 260-9, and 260-10 may be referred to the gesture recognition camera 260-2 and 260-3 of FIG. 2B.

For example, using the cameras 260-11 and 260-12, the wearable device 103 may obtain the image and/or a video to be transmitted to each of eyes of the user. The camera 260-11 may be disposed on a second surface 320 of the wearable device 103 to obtain the image to be displayed through a second display 250-2 corresponding to the right eye among the two eyes. The camera 260-12 may be disposed on a second surface 320 of the wearable device 103 to obtain the image to be displayed through a first display 250-1 corresponding to the left eye among the two eyes. The cameras 260-11 and 260-12 may be referred to a shooting camera 260-4 of FIG. 2B.

The wearable device 103 may include a depth sensor 330 disposed on a second surface 320 to identify a distance between the wearable device 103 and the external object. Using the depth sensor 330, the wearable device 103 may obtain spatial information (e.g., a depth map) on at least a portion of the FoV of the user wearing the wearable device 103. Although not illustrated, a microphone for obtaining sound outputted from the external object may be disposed on a second surface 320 of the wearable device 103. The number of the microphone may be one or more depending on an embodiment.

In accordance with one or more embodiments of the disclosure, the wearable device may provide VR or AR. In one or more embodiments, the wearable device may enhance the user's perception of the environment in their proximity.

Figure 4:
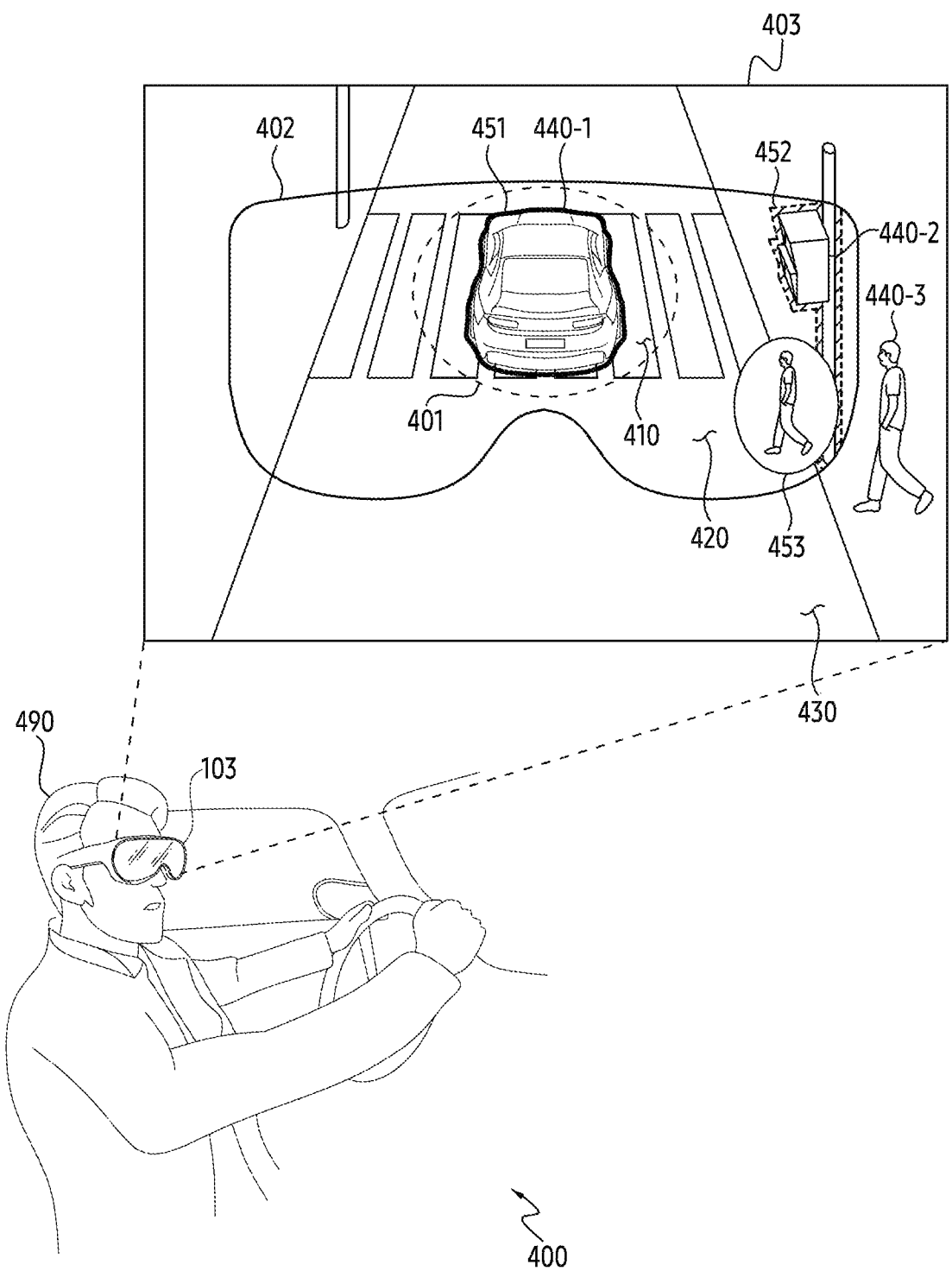
FIG. 4 illustrates an example of a method of providing notification information based on a position of an object.

FIG. 4 illustrates an example of a method of providing notification information based on a position of an object.

FIG. 4 illustrates the example 400 in which a user 490 wearing a wearable device 103 drives a vehicle. For example, the wearable device 103 of FIG. 4 may represent the example of an electronic device 101 of FIG. 1 or the wearable device 103 of any of FIGS. 2A to 3B.

According to one or more embodiments, the wearable device 103 may determine a context associated with the user, such as an action that the user is engaged in. The wearable device 103 may identify one or more objects that are associated with the action that the user is engaged in. Based on whether the objects are located in an area corresponding the user's gaze in the Field of View (FoV) (first area), outside the user's gaze and in the FoV (second area), or outside the FoV (third area), a different visual affect may be used.

The user 490 may drive while wearing the wearable device 103. The wearable device 103 may identify a context representing the situation of the user 490 based on information obtained through a sensor and a communication circuit included in the wearable device 103. For example, the context may define an action or a situation of the user 490. For example, the context may be referred to as a routine, situation information, an action that the user is engaged in, or a behavior pattern. In the example of FIG. 4, the context of the user 490 may be driving. However, an embodiment of the present disclosure is not limited thereto. For example, the context of the user 490 may be driving in a section with crosswalks and traffic lights. In other words, the context may be defined for the wearable device 103 to interpret the behavior or the situation of the user 490 and to provide the information or service required by the user 490.

The wearable device 103 may identify an object associated with the context. The object associated with the context may be referred to as an alarm object, an object of interest, a point of interest (POI), a visual element associated with the context, a visual object associated with the context, a graphic object associated with the context, or a target object. The object may be an object that is deemed relevant to the action that the user is performing. For example, if the user is driving, the object may be other vehicles or pedestrians. For example, the wearable device 103 may identify the object around the wearable device 103 based on the information obtained through the sensor and the communication circuit. For example, the wearable device 103 may identify the object associated with the context among the peripheral object based on the information and the identified context. For example, the wearable device 103 may identify a first object 440-1, a vehicle driving in front of the user's vehicle, a second object 440-2, a traffic light positioned in the section of the user's vehicle, and a third object 440-3, a pedestrian trying to cross a crosswalk within the section. FIG. 4 represents a case in which the user 490 actually drives while wearing the wearable device 103, and the first object 440-1, the second object 440-2, and the third object 440-3 may be a real object. However, an embodiment of the present disclosure is not limited thereto. For example, when the wearable device 103 provides VR, the object may include a rendered image that is not real. Hereinafter, for convenience of description, it is described focusing on the real object, but the object of an embodiment of the present disclosure may include the rendered image provided in VR.

The wearable device 103 may provide a visual effect according to the position of the object. The visual effect may be used to provide a notification (or alarm) for the object associated with the context. For example, the visual effect may be referred to as an alarm, alarm information, notification, and notification information.

For example, the wearable device 103 may provide a first visual effect 451 with respect to a first object 440-1 in a first area 410, the first area 410 may correspond to the gaze of the user 490. That is, the first area 410 may be included in a range 401 recognizable by the user 490 based on the direction of the gaze. Specific details associated with this are further described in FIGS. 7A and 7B below.

The first area 410 may be referred to as the user recognition area, a stare area, or a gaze area. According to an embodiment, a first visual effect 451 may include display of a first visual object. For example, the first visual object may include a line corresponding to a periphery of a first object 440-1. For example, the first visual object may be at least partially superimposed on the first object 440-1. However, the present disclosure is not limited thereto. For example, the first visual object may be displayed at a position spaced apart from the periphery of the first object 440-1 by a designated length without being at least partially superimposed on the first object 440-1. A first visual effect 451 is not limited to the first visual object. For example, a first visual effect 451 may include displaying a first object 440-1 by highlighting it through a first brightness. Also, for example, a first visual effect 451 may include displaying an indicator having a first size indicating a first object 440-1 in an area around a first object 440-1.

For example, the wearable device 103 may provide a second visual effect 452 with respect to a second object 440-2 in a second area 420 identified based on a field of view (FoV) 402 of the wearable device 103. The first area 410 may be included in the FoV 402. The second area 420 may represent at least a partial area of the field of view FoV 402 distinguished from a first area 410. For example, the second area 420 may be an area that is outside the user's gaze. The second area 420 may be referred to as a display area of the wearable device 103. The second visual effect 452 may include blink of the first visual object. For example, the first visual object for a second object 440-2 may include a line corresponding to a periphery of the second object 440-2 and having a designated thickness.

However, the present disclosure is not limited thereto. For example, the first visual object for a second object 440-2 may be displayed at the position spaced apart from the periphery of the second object 440-2 by a designated length without being at least partially superimposed on the second object 440-2. For example, the first visual object for a second object 440-2 may be at least partially superimposed on the second object 440-2. At this time, the first visual object for a second object 440-2 may blink the designated number of times (or for a designated time). However, the second visual effect 452 is not limited to displaying and blinking of the first visual object. For example, the second visual effect 452 may include displaying the second object 440-2 by highlighting through a second brightness brighter than the first brightness. Or, for example, the second visual effect 452 may include displaying the indicator having a second size greater than the first size indicating the second object 440-2 in an area around the second object 440-2.

For example, the wearable device 103 may provide a third visual effect 453 for the object 440-3 in the third area 430. For example, the third area 430 may represent area outside of the FoV and may represent an area within a recognizable range 403 based on information obtained by the wearable device 103. The third area 430 may be referred to as a recognition area of the wearable device 103 or an identification area of the wearable device 103. For example, the range 403 may be identified based on the information obtained by the wearable device 103. For example, in case that the information is communication information obtained from an external electronic device (e.g., a beacon or an access point (AP)) connected through the communication circuit, the range 403 may be identified based on a position of another external electronic device identifiable based on the communication information. The third visual effect 453 may include the display of a second visual object. For example, the second visual object may include a rendered image representing a third object 440-3. For example, the user 490 may not recognize the third object 440-3 outside of the FoV 402, and only the wearable device 103 may recognize the third object 440-3. In addition, since the third object 440-3 is positioned outside of the FoV 402, it may not be displayed through the display of the wearable device 103. Accordingly, the wearable device 103 may display the second visual object, which is the rendered image for the third object 440-3, through a partial area of the FoV 402. For example, the partial area may represent an area within the FoV 402 adjacent to the area outside of the FoV 402 where the third object 440-3 is positioned. For example, the partial area may be referred to as a corner of the FoV, an edge, a corresponding area of the FoV, an adjacent area, or an interest area. In the example 400 of FIG. 4, the partial area may include a lower right side. In this case, the third object 440-3 may be positioned in the right direction (or a rear right side) on the basis of the user 490. However, the third visual effect 453 according to an embodiment of the present disclosure is not limited to the second visual object. For example, the third visual effect 453 may further include a display of the indicator for representing a direction in which the third object 440-3 is positioned, as well as the display of the second visual object.

In the example 400, a method of providing the visual effect with respect to the real object and the user 490 is illustrated, but an embodiment of the present disclosure is not limited thereto. An embodiment of the present disclosure may be applied to the virtual object within a virtual environment and an avatar of the user 490. For example, the real object may correspond to a virtual object within a virtual environment, and the user 490 may correspond to the avatar of the user 490. Accordingly, a first area 410 may be identified according to the gaze of the avatar, and a second area 420 within a range (or FoV) in which at least a portion of the virtual environment is displayed may be identified through the wearable device 103. In addition, an area within a range recognizable by the wearable device 103 among the virtual environment outside of the at least portion may be identified as a third area 430.

The wearable device 103 may not simply display an object within the XR through the display (or display area) of the wearable device 103, identify necessary information (e.g., object) about a situation or an action performed by the user 490, and provide an alarm for the identified object. The electronic device and method according to embodiments of the present disclosure may effectively provide the user 490 with information about a situation (or context) recognized by the wearable device 103 and an object according to the situation. Accordingly, the electronic device and method according to embodiments of the present disclosure may provide the alarm for increasing the degree of attention to the object in case that the user 490 has a low degree of attention to the object. For example, in case that the user 490 does not pay attention to an obstacle positioned in front when walking on the road, does not see the bus to be boarded coming in when using public transportation, does not stare at traffic light pedestrian when driving, or cannot find a destination near the destination when using navigation, the wearable device 103 may provide information suitable for the user 490's situation and provide convenience by providing the alarm.

Figure 5:
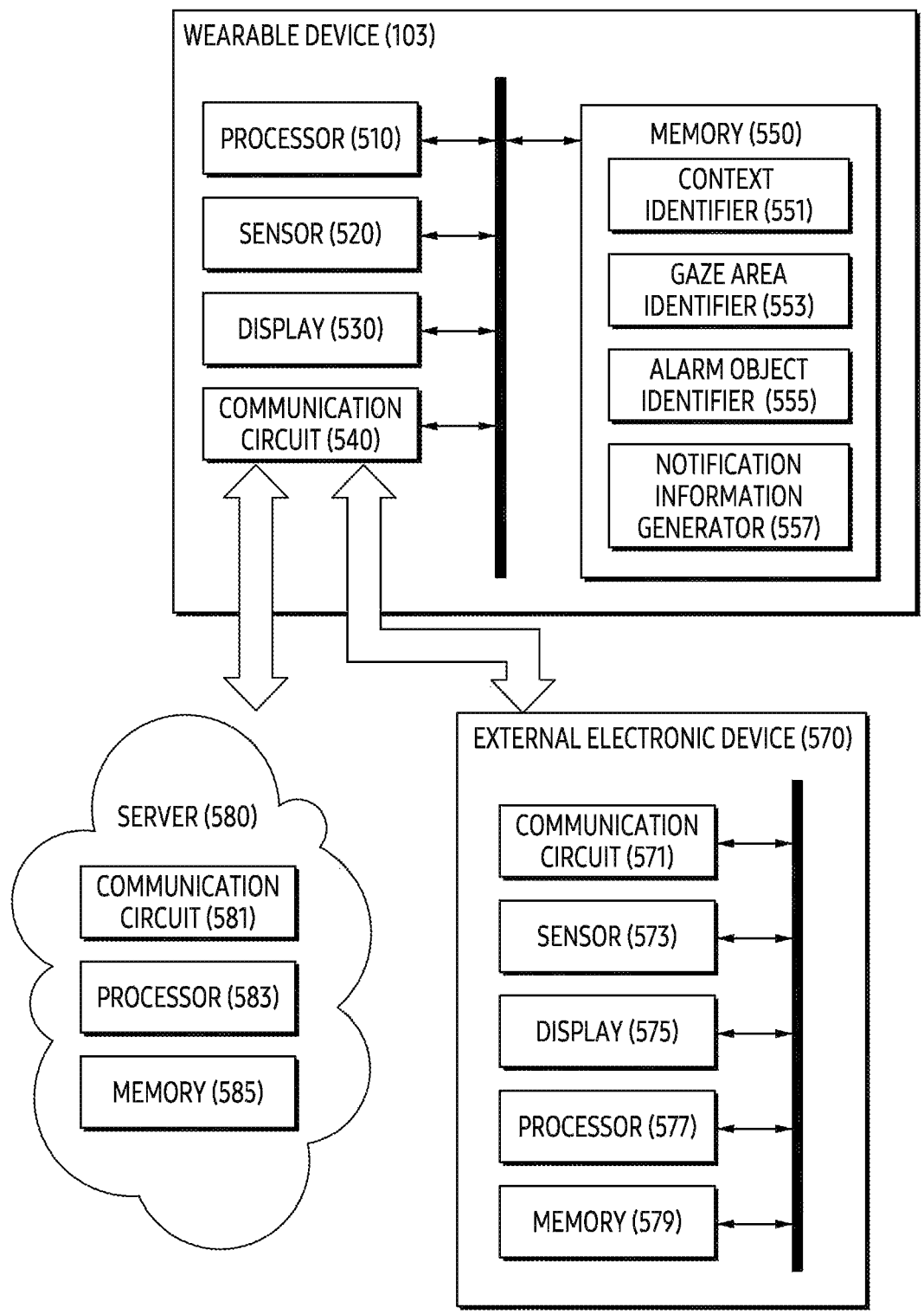
FIG. 5 illustrates an exemplary block diagram of a wearable device.

FIG. 5 illustrates an exemplary block diagram of a wearable device.

The wearable device 103 of FIG. 5 may be an example of an electronic device 101 of FIG. 1 and the wearable device 103 of FIGS. 2A to 3B.

Referring to FIG. 5, an exemplary situation is illustrated in which the wearable device 103, an external electronic device 570, and a server 580 are connected to each other based on a wired network and/or a wireless network. For example, the wired network may include a network such as the Internet, a local area network (LAN), a wide area network (WAN), or a combination thereof. For example, the wireless network may include a network such as long term evolution (LTE), 5g new radio (NR), wireless fidelity (WiFi), Zigbee, near field communication (NFC), Bluetooth, Bluetooth low-energy (BLE), or the combination thereof. Although the wearable device 103, the external electronic device 570, and the server 580 are illustrated to be directly connected, the wearable device 103, the external electronic device 570, and the server 580 may be indirectly connected through one or more router and/or access point (AP). In other words, the wearable device 103 is illustrated to be directly connected to a communication circuit 571 of the external electronic device 570 (or a communication circuit 581 of the server 580) through the communication circuit 540, but an embodiment of the present disclosure is not limited thereto.

Referring to FIG. 5, the wearable device 103 may include a processor 510, a sensor 520, a display 530, a communication circuit 540, and a memory 550. The processor 510, the sensor 520, the display 530, the communication circuit 540, and the memory 550 may be electronically and/or operably coupled with each other by a communication bus. Hereinafter, an operational combination of hardware components may mean that direct or indirect connection between hardware components are established wired or wirelessly so that a second hardware component is controlled by a first hardware component among the hardware components. Although illustrated based on different blocks, the disclosure is not limited thereto, and the portion of the hardware component illustrated in FIG. 5 (at least some of the processor 510, the sensor 520, the display 530, the communication circuit 540, and the memory 550) may be included in a single integrated circuit such as a system on a chip (SoC). A type and/or the number of hardware component included in the wearable device 103 is not limited to those illustrated in FIG. 5. For example, the wearable device 103 may include a portion of the hardware component illustrated in FIG. 5. It shall also be understood that the wearable device 103 may include additional components, as well as omit some of the foregoing components.

The processor 510 of the wearable device 103 may include the hardware component for processing data based on one or more instructions. Hardware component for processing data may include, for example, an arithmetic and logic unit (ALU), a floating point unit (FPU), and a field programmable gate array (FPGA). For example, the hardware component for processing data may include central processing unit (CPU), graphics processing unit (GPU), digital signal processing (DSP), and/or neural processing unit (NPU). The number of the processor 510 may be one or more. For example, the processor 510 may have a structure of a multi-core processor such as a dual core, a quad core, or a hexa core. The processor 510 of FIG. 5 may include at least a portion of a processor 120 of FIG. 1.

The sensor 520 of the wearable device 103 may include at least one sensor. For example, the sensor 520 may include at least a portion of the sensor module 176 of FIG. 1, the camera module 180 of FIG. 1, and the input module 150 of FIG. 1. For example, the sensor 520 may include an IMU (or IMU sensor), a bio sensor, an image sensor (or camera), an acoustic sensor (or microphone (or mic)), a gyro sensor, a gravity sensor, and/or an acceleration sensor.

The wearable device 103 may obtain the image of an area around a user (e.g., the user 490 of FIG. 4) wearing the wearable device 103 based on the sensor 520. For example, the wearable device 103 may obtain an image of the peripheral area through a camera included in the sensor 520. For example, the peripheral area may represent an omnidirectional of the user (or the wearable device 103). The wearable device 103 may identify at least one object within the image based on the image of the peripheral area.

The wearable device 103 may obtain acoustic information of the area around the user based on the sensor 520. For example, the wearable device 103 may obtain the acoustic information through the microphone included in the sensor 520. For example, the acoustic information may include a voice of the user. The wearable device 103 may identify the voice uttered by the user or a word (or sentence) necessary for the user based on the acoustic information.

The wearable device 103 may obtain biometric information of the user based on the sensor 520. For example, the wearable device 103 may obtain the biometric information based on the bio sensor included in the sensor 520. For example, the biometric information may include at least one of heart rate, body fat information, blood pressure, or pupil size of the user. The wearable device 103 may identify a context of the user by identifying the user's health state based on the biometric information. The wearable device 103 may identify the first area (or user gaze area) based on a gaze of the user based on the biometric information.

The wearable device 103 may identify a moving direction and a moving speed of the user, or a direction in which a head of the user faces, based on the sensor 520. For example, the wearable device 103 may identify the moving direction and the moving speed of the user, or the direction in which the head of the user faces based on the IMU sensor included in the sensor 520. The wearable device 103 may identify the first area (or user gaze area) based on the gaze of the user based on the moving direction and the moving speed of the user, or the direction in which the head of the user faces.

The wearable device 103 may identify position information of the wearable device 103 based on the sensor 520. For example, the wearable device 103 may identify the position information of the wearable device 103 based on GPS information. Also, for example, the wearable device 103 may identify current time information and temperature or atmospheric pressure information around the wearable device 103 based on the sensor 520.

Figure 8A:
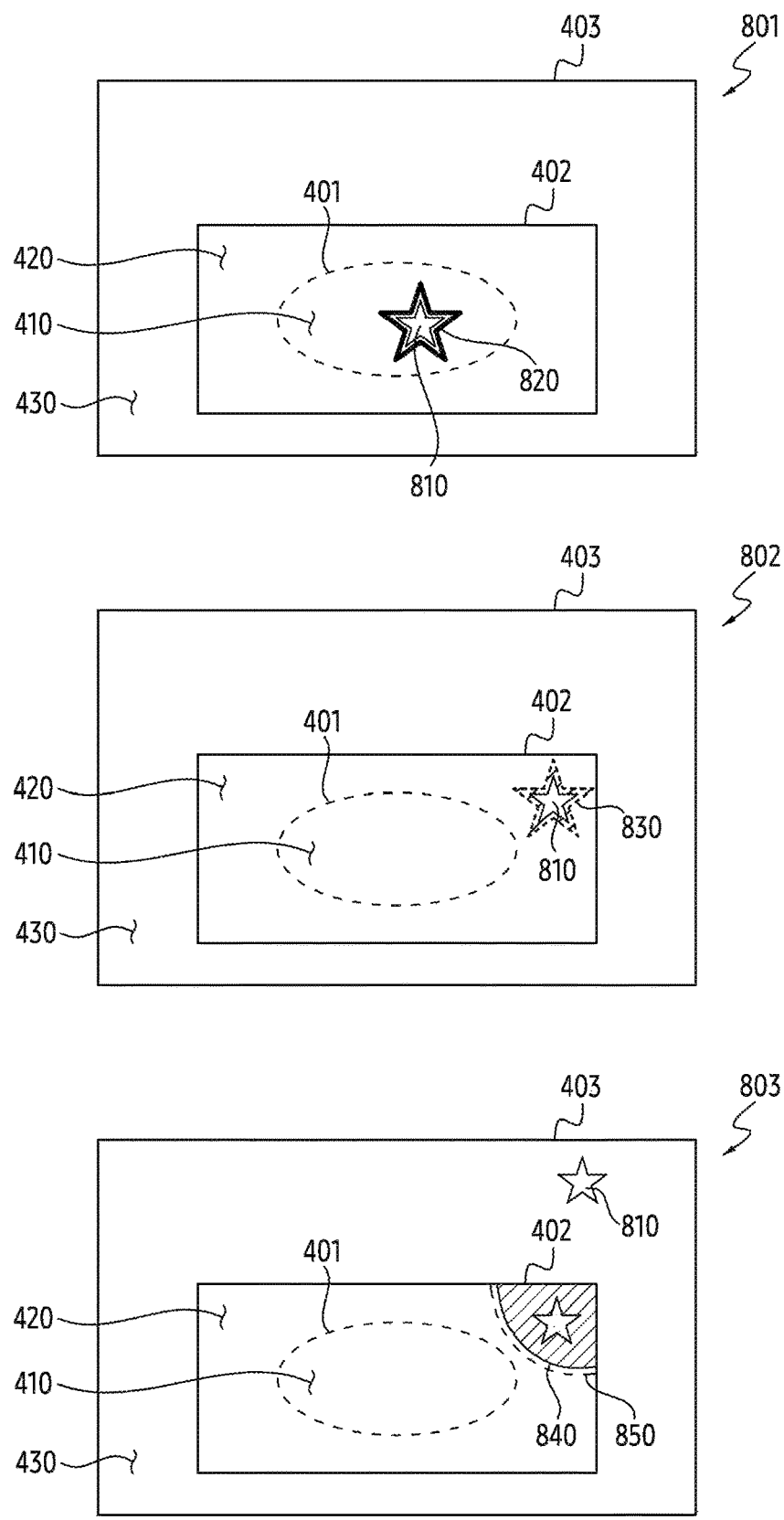
FIGS. 8A and 8B illustrate examples of visual effect provided according to a position and type of the object.
Figure 8B:
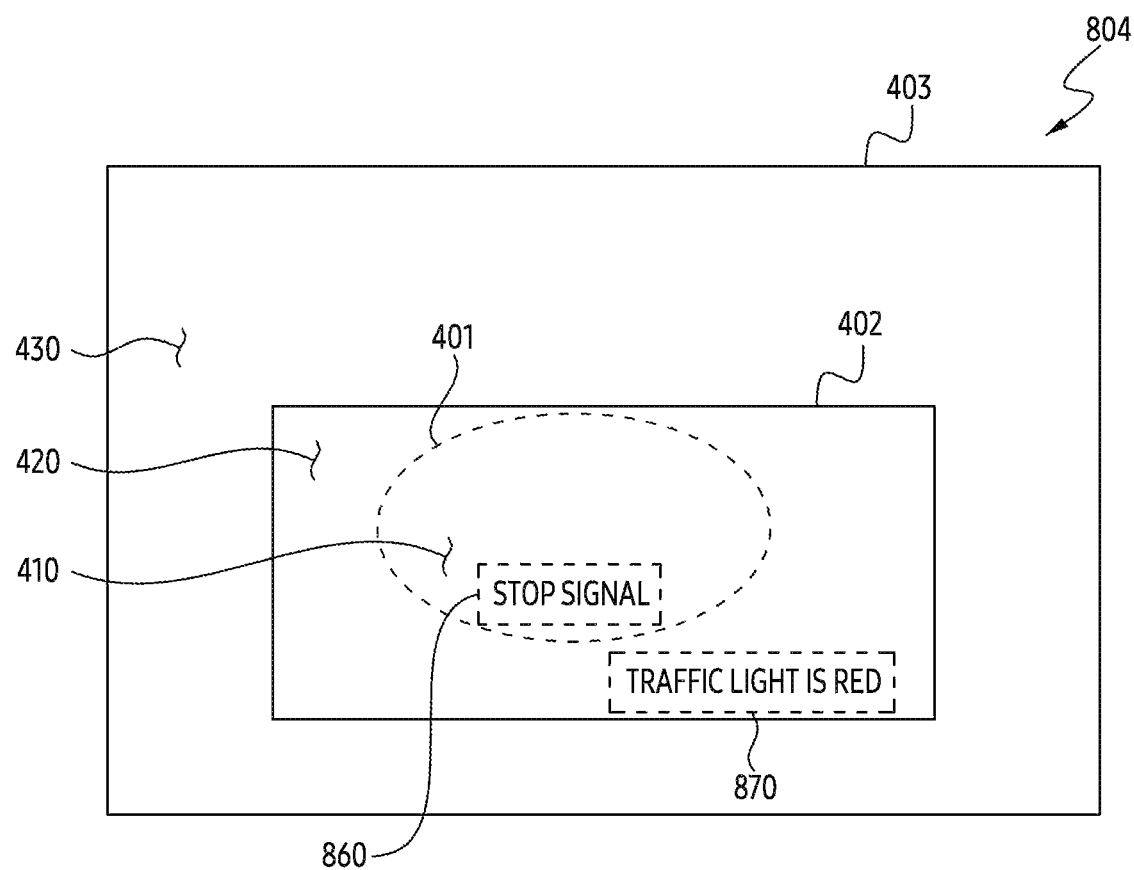
Figure 9A:
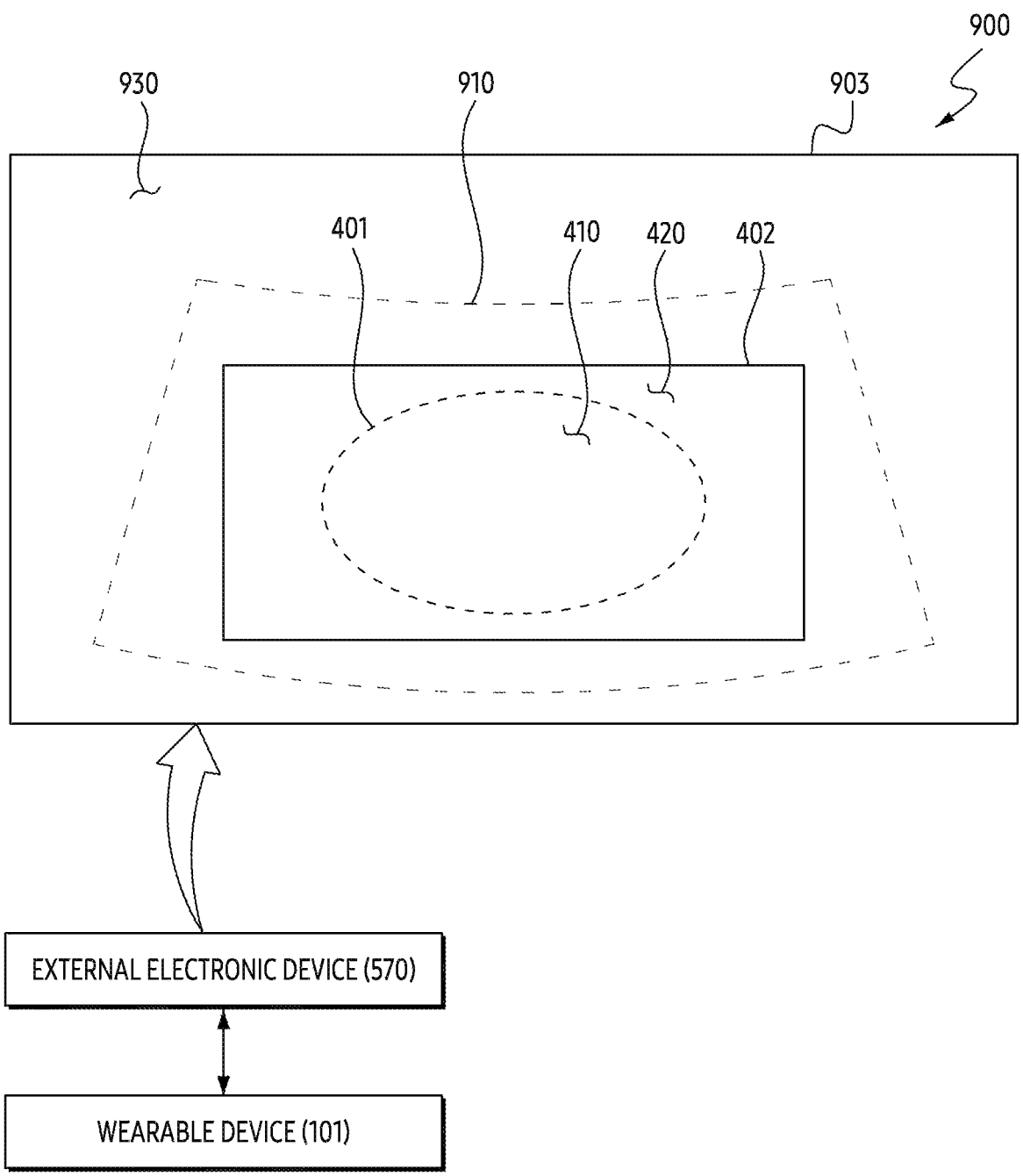
FIG. 9A illustrates an example of a recognition area identified when a user wearing a wearable device uses a vehicle.
Figure 9B:
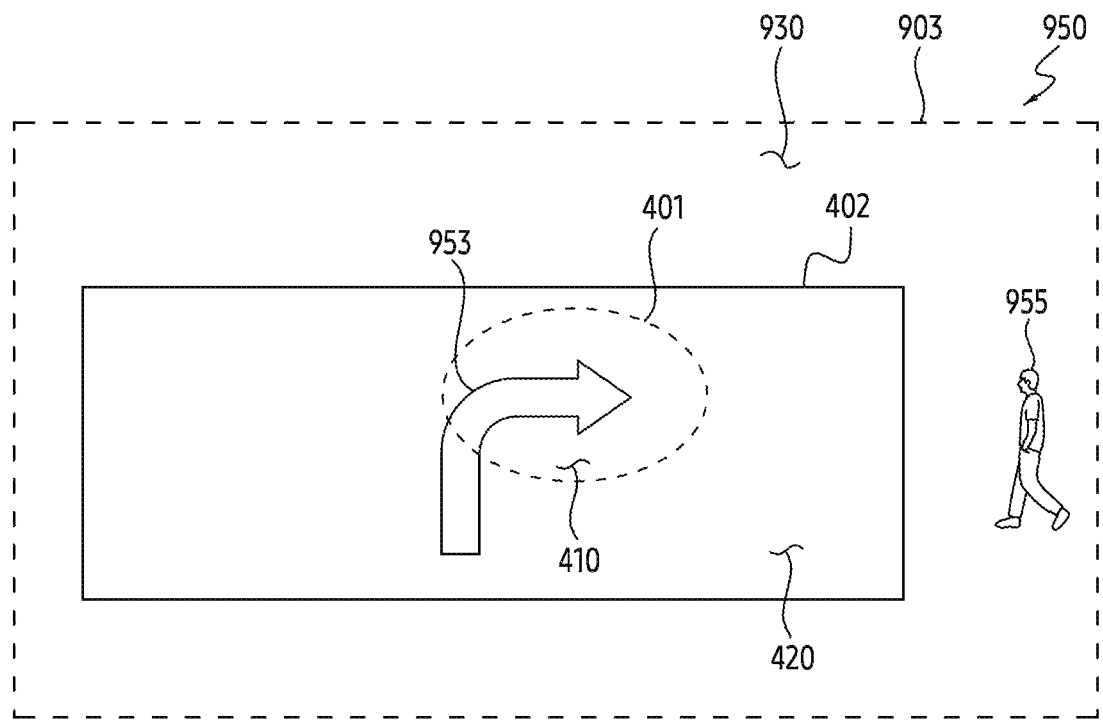
FIG. 9B illustrates an example of a wearable device that provides notification information based on information provided from a vehicle.
Figure 9B:
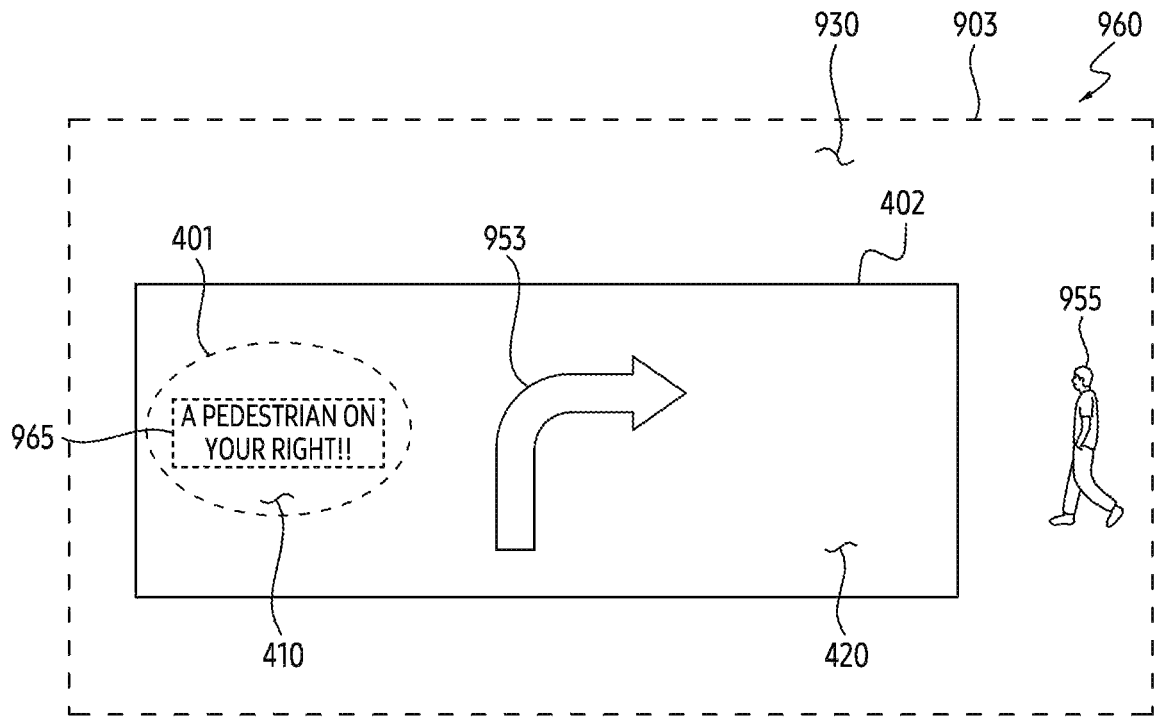
Figure 10A:
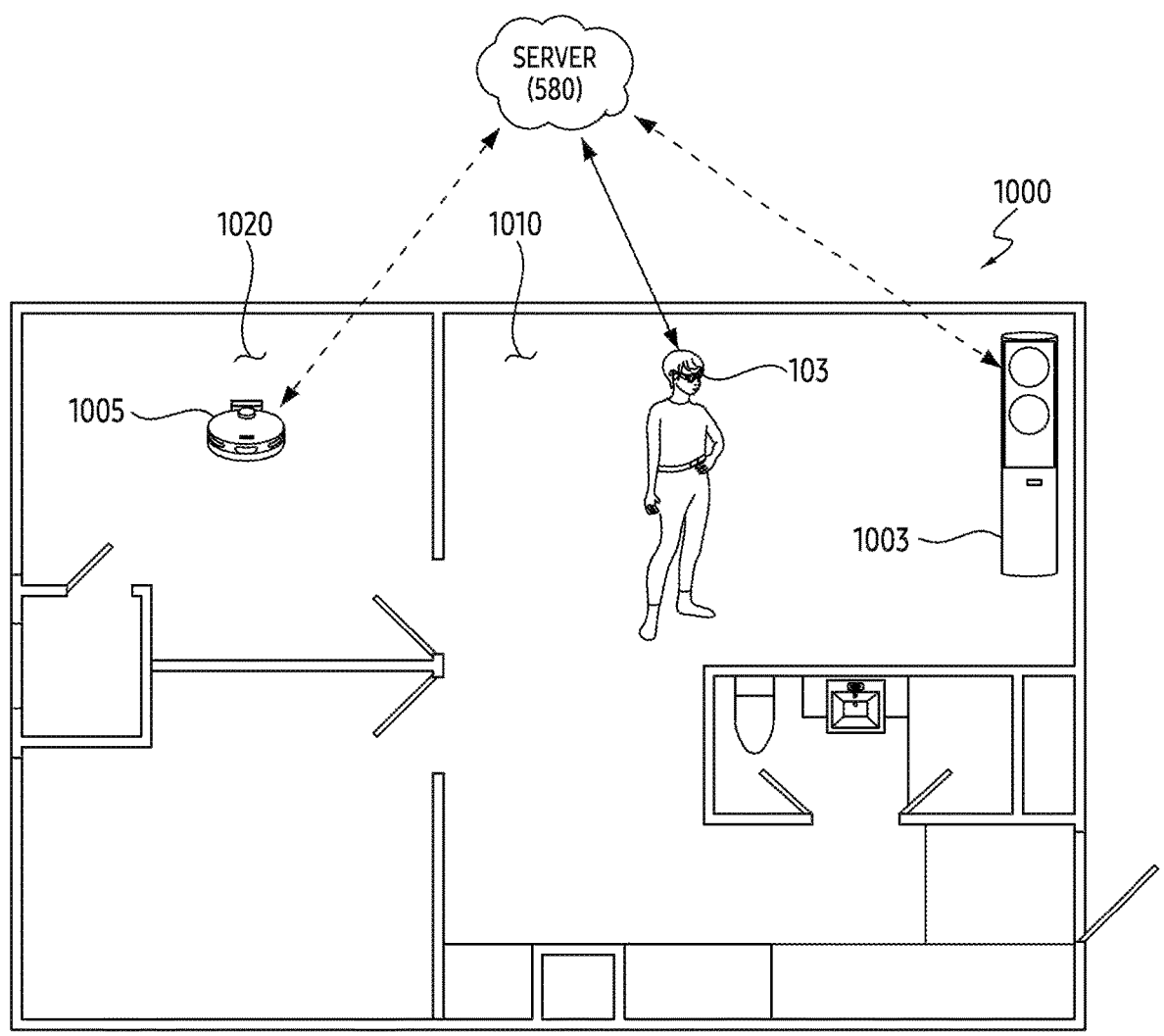
FIGS. 10A and 10B illustrate an example of a method of providing notification information based on a space in which an external electronic device is positioned.
Figure 10B:
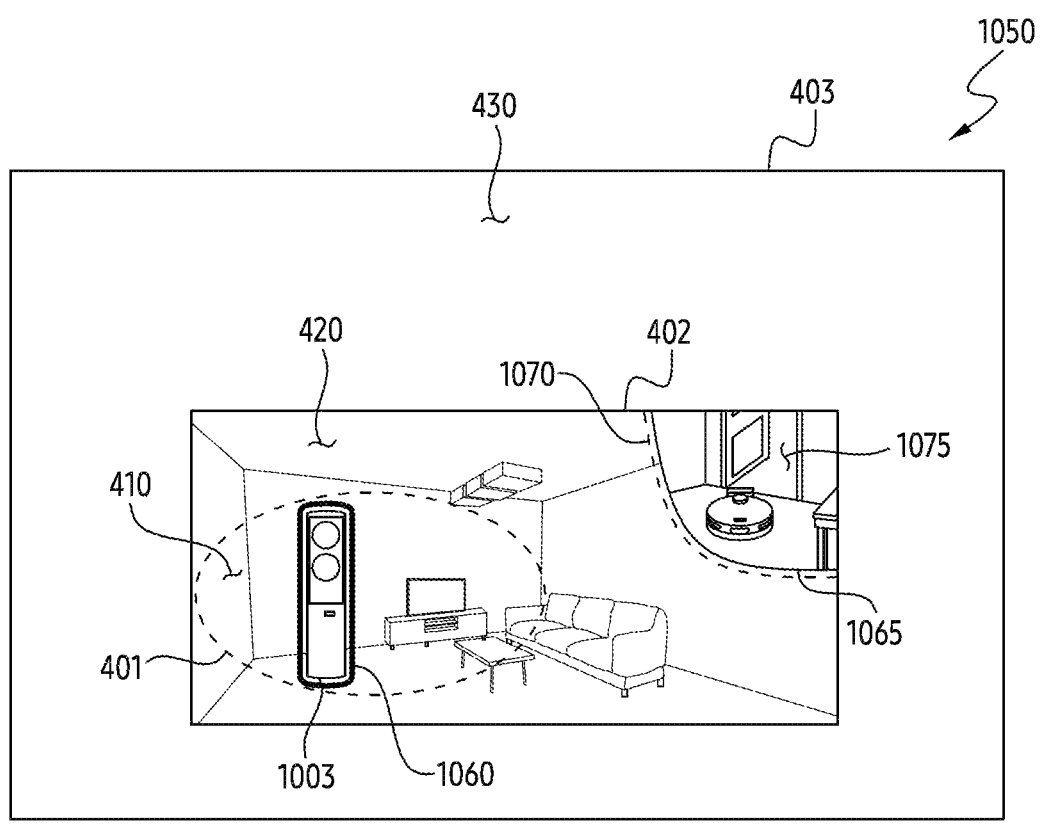

The display 530 of the wearable device 103 may output visualized information to the user (for example, a screen of FIG. 4, a screen of FIGS. 8A and 8B, a screen of FIG. 9B, and a screen of FIGS. 10A and 10B). The number of the display 530 included in the wearable device 103 may be one or more. For example, the display 530 may output visualized information to the user by being controlled by the processor 510 and/or the graphic processing unit (GPU) (not illustrated). The display 530 may include a flat panel display (FPD), and/or electronic paper. The flat panel display (FPD) may include a liquid crystal display (LCD), a plasma display panel (PDP), a digital mirror device (DMD), one or more light emitting diodes (LEDs), and/or a micro LED. The light emitting diode (LED) may include an organic LED (OLED). The display 530 of FIG. 5 may include at least a portion of a display module 160 of FIG. 1.

In an embodiment, transmission of light may occur in at least a portion of the display 530. The wearable device 103 may provide the user experience associated with augmented reality by providing the user with a combination of light outputted through the display 530 and light passing through the display 530. As described above with reference to FIGS. 2A and 2B, and/or 3A and 3B, the display 530 of the wearable device 103 according to an embodiment may have a structure for covering the entire FoV of the user or emitting light toward the FoV of the user in a state of being worn on a portion of a body of the user such as a head. Although not illustrated, the wearable device 103 may include another output means for outputting information in a form other than a visual form and an audible form. For example, the wearable device 103 may include at least one speaker for outputting an audio signal, and/or a motor (or actuator) for providing haptic feedback based on vibration. In the above example, the display 530 for providing the user experience associated with the augmented reality is illustrated, but an embodiment of the present disclosure is not limited thereto. For example, the wearable device 103 may render an image for providing the user experience related to a virtual reality and display the rendered image through the display 530. At this time, the rendered image may include a visual object corresponding to an object associated with the context of the user.

The communication circuit 540 of the wearable device 103 may include hardware for supporting transmission and/or reception of an electrical signal between the wearable device 103 and the external electronic device 570 (or server 580). The communication circuit 540, for example, may include at least one of a MODEM, an antenna, and an optic/electronic (O/E) converter. The communication circuit 540 may support the transmission and/or reception of the electrical signal based on various type of communication means such as Ethernet, Bluetooth (BT), Bluetooth low energy (BLE), ZigBee, long term evolution (LTE), 5G new radio (NR), and wireless fidelity (WiFi). The communication circuit 540 of FIG. 5 may include at least a portion of a communication module 190 of FIG. 1 and/or an antenna module 197.

The wearable device 103 may obtain the communication information from another external electronic device connected through the communication circuit 540. For example, the communication circuit 540 may include a Wi-Fi module or a BT module. For example, the other external electronic device may include a router connected through a Wi-Fi module and a beacon connected through the BT module. For example, the communication information may include information about electronic devices connected to the router or the beacon. For example, the communication information may include a position of the electronic devices, information of the electronic devices (e.g., type, model name), information used by the electronic devices (e.g., traffic information, position information), and a position of the wearable device 103.

The wearable device 103 may identify the context and the object representing a situation of the user of the wearable device 103 based on the information obtained through the sensor 520 and the communication circuit 540. For example, the information may identify an image of the peripheral area, the acoustic information, the biometric information of the user, the moving direction and the moving speed of the user, or the direction the head of user is facing and position information of the wearable device 103. At least one of current time information, the temperature or atmospheric pressure information around the wearable device 103, or the communication information may be included. For example, based on the information, the wearable device 103 may identify the context. Also, for example, based on the information, the wearable device 103 may identify then object positioned around the user (or around an avatar corresponding to the user within the virtual space). The surroundings of the user may be understood substantially the same as the surroundings of the wearable device 103 worn by the user. The object positioned around the user may represent one or more objects that may be identified based on the information. The object positioned around the user may be different from an object (or an alarm object) associated with the context. Thereafter, the wearable device 103 may identify the object associated with the context among object positioned around the user. In other words, the information may be used to identify the context, the object positioned around the user, and the object associated with the context.

The memory 550 of the wearable device 103 may include the hardware component for storing data and/or an instruction input to the processor 510 and/or output from the processor 510. The memory 550, for example, may include a volatile memory such as a random-access memory (RAM), and/or a non-volatile memory such as a read-only memory (ROM). The volatile memory, for example, may include at least one of dynamic RAM (DRAM), static RAM (SRAM), Cache RAM, and pseudo SRAM (PSRAM). The nonvolatile memory, for example, may include at least one of a programmable ROM (PROM), an crasable PROM (EPROM), an electrically erasable PROM (EEPROM), a flash memory, a hard disk, a compact disk, and an embedded multimedia card (cMMC). The memory 550 of FIG. 5 may include at least a portion of the memory 130 of FIG. 1.

Although not illustrated, the wearable device 103 may include an output means for outputting information in a different form other than a visualized form. For example, the wearable device 103 may include a speaker for outputting an acoustic signal. For example, the wearable device 103 may include a motor for providing haptic feedback based on vibration.

The wearable device 103 may operate in conjunction with an external electronic device 570 and a server 580. In one or more embodiments, the wearable device 103 may establish a short-range communication link with the external electronic device 570, such as a Bluetooth connection. A server 580 may also be used to provide certain information in response to a query.

Referring to FIG. 5, within the memory 550 of the wearable device 103, according to an embodiment, one or more instructions (or commands) representing calculation and/or operation to be performed by the processor 510 of the wearable device 103 on data may be stored. A set of one or more instructions may be referred to as a program, firmware, operating system, process, routine, sub-routine and/or application. Hereinafter, an installation of the application within the electronic device (e.g., the wearable device 103) may mean that one or more instructions provided in the form of the application are stored in the memory 550 and the one or more applications are stored in an executable format (e.g., a file with an extension designated by the operating system of the wearable device 103). The wearable device 103 may perform the operation of FIGS. 6, 11, and 12 by executing one or more instructions stored in the memory 550.

Referring to FIG. 5, one or more instructions included in the memory 550 may be divided into a context identifier 551, a gaze area identifier 553, an alarm object identifier 555, and/or a notification information generator 557. For example, each of the context identifier 551, the gaze area identifier 553, the alarm object identifier 555, and the notification information generator 557 may be implemented as a program or software. The wearable device 103 may identify the context representing the situation of the user by using the context identifier 551. For example, the wearable device 103 may obtain the information through the sensor 520 and the communication circuit 540. For example, the wearable device 103 may identify the context using the context identifier 551 based on the obtained information. For example, the context may define an action or a situation of the user. For example, the context may be referred to as a routine, situation information, an action that the user is engaged in, or behavior pattern. In other words, the context may be defined for the wearable device 103 to interpret the user's behavior or situation and provide information or services needed by the user. For example, the context may include that the user moves on foot, that the user uses public transportation, that the user drives, that the user is watching a performance, that the user orders a menu at the restaurant, that the user cooks, and that the user is resting. However, an embodiment of the present disclosure is not limited thereto.

The wearable device 103 may identify the context further based on an application that the user is using through the wearable device 103. For example, in case that the user is using a map application, the wearable device 103 may identify the context as being associated with movement. Also, for example, in case that the user is using a public transportation search application, the context may be identified as being associated with using the public transportation. For example, when the user is using the recipe providing application, the context may be identified as being associated with cooking. The wearable device 103 may store a table in the memory 550 that associates different applications with different contexts.

In one or more embodiments, the context identifier 551 may identify the context based on a comparison of information from the sensor 573 to a library of information corresponding to known contexts of the user.

In one or more embodiments, the user can provide the context to the context identifier 551 as an input.

In one or more embodiments, the wearable device 103 may capture an image, and provide the image to a server that uses artificial intelligence to identify objects in the image and determine an action that the user is engaged in, based on the identified objects.

According to an embodiment, a wearable device 103 may identify the first area using a gaze area identifier 553. For example, the wearable device 103 may identify a gaze direction of the user using an eye tracking camera (ET CAM). For example, the wearable device 103 may identify the first area based on input of the user on the basis of the identified direction of the gaze. For example, the wearable device 103 may perform calibration for identifying the first area. For example, the calibration may include identifying a size of the first area by obtaining the user's input for a calibration object displayed at an arbitrary position on the basis of the direction of the gaze. For example, the user's input may include a various gesture such as a touch input, a grip input, a press input, and a drag input. Specific details associated with this are described in FIG. 7A below.

The wearable device 103 may change a size of the first area by using the gaze area identifier 553. For example, the wearable device 103 may change the size and position of the first area based on the information obtained through the sensor 520. For example, the size of the first area or the position of the first area may be changed based on a size of pupil of the user or whether the user moves. Specific details associated with this are described in FIG. 7B below.

The wearable device 103 may identify an alarm object using the alarm object identifier 555. The alarm object may represent an object associated with the context identified through the context identifier 551. The alarm object may be referred to as an object associated with the context, an object of interest, a point of interest (POI), a visual element associated with the context, a visual object associated with the context, a graphic object associated with the context, or a target object. The alarm object identifier 555 may include a library of objects that are known to be associated with different contexts. For example, the alarm object identifier 555 may list other vehicles, pedestrians, traffic lights, and street signs as objects associated with driver.

For example, the wearable device 103 may identify an object around the wearable device 103 based on the information obtained through the sensor 520 and/or the communication circuit 540 by using the alarm object identifier 555. For example, the wearable device 103 may identify the object (i.e., the alarm object) associated with the context among the surrounding object, based on the identified context representing the situation of the user. For example, in case that the context is moving toward a specific destination through walking on foot or public transportation, the alarm object may include public transportation to be boarded, destination, obstacle, traffic light, crosswalks, and an external object with a risk of collision (e.g., bicycle). Or, in case that the context is vehicle driving, the alarm object may include a traffic light, nearby crosswalk situation on the route, and a blind spot of the vehicle. Or, in case that the context is a watching performance such as a musical and a play, the object may include an actor, a stage area, or an actor's line. Or, in case that the context is that a menu is ordered at a restaurant, the object may include order completion information or a clerk, and the like.

The wearable device 103 may identify a priority for the alarm object by using the alarm object identifier 555. For example, the wearable device 103 may identify a priority for the alarm object based on the context. For example, the priority may represent an emergency level (or urgency) that defines an order in which notification information is provided among alarm objects associated with the context. For example, the priority may be referred to as notification level, notification order, urgency, or emergency level. According to an embodiment, in case that the priority of the alarm object is higher than or equal to a reference level, the wearable device 103 may display text describing the alarm object within the FoV of the wearable device 103. Specific details associated with this are described in FIG. 8B below.

The wearable device 103 may identify a notification function available with notification information on the alarm object by using the alarm object identifier 555. For example, the notification function may include an additional action different from the notification information displayed through the display 530 of the wearable device 103 and performed with a display of the notification information. For example, in case that the wearable device 103 is connected to a vehicle, the notification function may include vibration of a handle of the vehicle or a change in the seat position. However, an embodiment of the present disclosure is not limited thereto. For example, the notification function may include vibration of the wearable device 103 or blinking of a light emitting module included in the wearable device 103.

The wearable device 103 may generate the notification information by using the notification information generator 557. For example, the notification information may include a visual effect (e.g., a first visual effect 451, a second visual effect 452, and a third visual effect 453 of FIG. 4) on the alarm object. Also, for example, the notification information may include text associated with the alarm object. Also, for example, the notification information may include voice information that converts the text into speech.

The wearable device 103 may identify whether the alarm object is visual information. The visual information may represent a type of the alarm object. For example, the type may include the visual information representing an image and non-visual information including text and voice. For example, in case that the alarm object is visual information (e.g., a specific object), the wearable device 103 may provide a visual effect according to the position of the alarm object. Also, for example, in case that the alarm object is the non-visual information (e.g., text or voice), the wearable device 103 may provide notification information according to the alarm object. When the non-visual information is text, the wearable device 103 may display a visual object representing the text through the display 530. Also, in case that the non-visual information is a voice, the wearable device 103 may output the voice. Specific details associated with this are described in FIG. 6 below.

According to an embodiment, an external electronic device 570 may include at least one of a communication circuit 571, a sensor 573, a display 575, a processor 577, and a memory 579. The communication circuit 571, the sensor 573, the display 575, the processor 577, or the memory 579 may be electronically and/or operably coupled with each other by an electronical component such as a communication bus. A type and/or the number of hardware component included the external electronic device 570 is not limited to those illustrated in FIG. 5. For example, the external electronic device 570 may include only some of the hardware component illustrated in FIG. 5. For example, the communication circuit 571 may correspond to a communication circuit 540 of the wearable device 103. For example, the sensor 573 may correspond to the sensor 520 of the wearable device 103. For example, the display 575 may correspond to the display 575 of the wearable device 103. For example, the processor 577 may correspond to the processor 510 of the wearable device 103. For example, the memory 579 may correspond to the memory 550 of the wearable device 103. In order to reduce repetition of the description, overlapping descriptions may be omitted. For example, the external electronic device 570 may include a vehicle connected to the wearable device 103. For example, an example of the external electronic device 570 is described in FIGS. 9A and 9B below. The external electronic device 570, which is the vehicle, may transmit and receive a signal to and from another vehicle or another device connected through the communication circuit 571. For example, the communication circuit 571 may include a module for vehicle to everything (or vehicle to x (V2X)). For example, the external electronic device 570 may obtain data such as surrounding traffic information or information on pedestrians based on a module for V2X.

According to an embodiment, a server 580 may include at least one of a communication circuit 581, a processor 583, and a memory 585. The communication circuit 581, the processor 583, or the memory 585 may be electronically and/or operably coupled with each other by an electronical component such as a communication bus. A type and/or the number of hardware component included the server 580 is not limited to those illustrated in FIG. 5. For example, the server 580 may include only some of the hardware component illustrated in FIG. 5. For example, the communication circuit 581 may correspond to a communication circuit 540 of a wearable device 103. For example, the processor 583 may correspond to the processor 510 of the wearable device 103. For example, the memory 585 may correspond to the memory 550 of the wearable device 103. In order to reduce repetition of the description, overlapping descriptions may be omitted. For example, the server 580 may be connected to at least one internet of things (IoT) device. For example, the server 580 may represent the external electronic device that manages the at least one IoT device. For, examples, an example of the server 580 are described in FIGS. 10A and 10B below.

Figure 6:
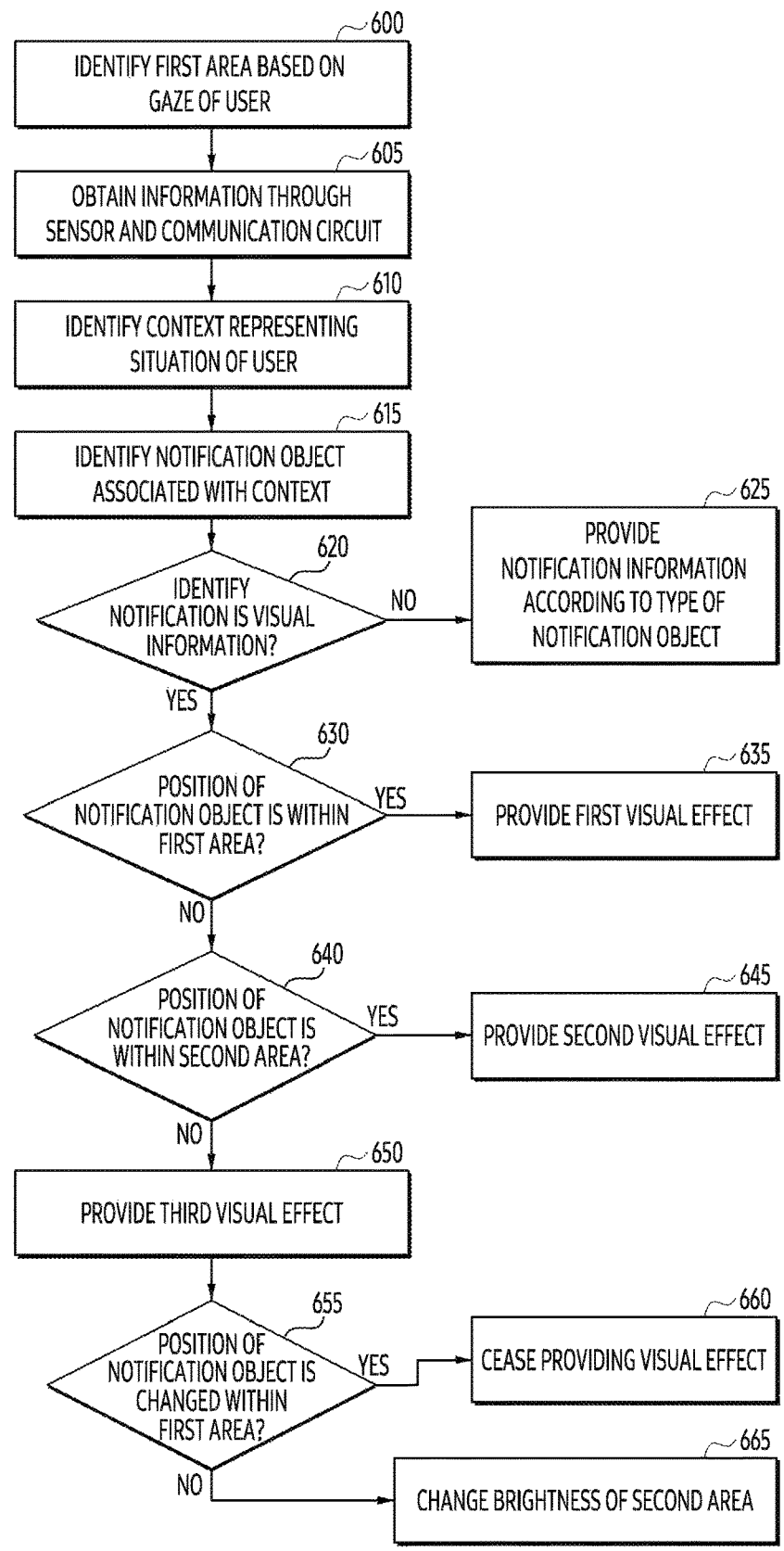
FIG. 6 illustrates an example of operation flow for a method of identifying an object according to a context of a user and providing notification information based on a position of the identified object.

FIG. 6 illustrates an example of operation flow for a method of identifying an object according to a context of a user and providing notification information based on a position of the identified object.

At least a portion of the method of FIG. 6 may be performed by the wearable device 103 of FIG. 5. For example, at least a portion of the method may be controlled by the processor 510 of the wearable device 103. In the following embodiment, each operation may be performed sequentially, but is not necessarily performed sequentially. For example, the sequence of each operation may be changed, and at least two operations may be performed in parallel.

As will be explained in greater detail below, the wearable device 103 may determine a first area corresponding to a gaze of the user. Based on information from the sensor, the wearable device 103 may identify the context of the user, as well as objects associated with the context. Based on whether the object is in an area corresponding to the user gaze, a first area, an area within the FoV and outside the first area, a second area, or outside the FoV, a third area, a different visual effect may be provided.

Referring to FIG. 6, although not illustrated in FIG. 6, the wearable device 103 may execute an application including a plurality of instructions that cause the wearable device 103 to provide an extended reality. Hereinafter, for convenience of description, augmented reality will be described as the basis, but an embodiment of the present disclosure may be applied to virtual reality or mixed reality. For example, the wearable device 103 may identify whether a function providing the notification information is set based on a position of the object when the plurality of instructions are is executed. For example, the function of providing the notification information based on the position of the object may be activated or deactivated in a global setting of the wearable device 103 or a setting within an application that includes the plurality of instructions. In other words, in case that the function is activated, the wearable device 103 may provide the notification information based on a position of the object described below.

According to an embodiment, in operation 600, the wearable device 103 may identify a first area based on a gaze of a user. For example, the wearable device 103 may perform calibration for identifying the first area. The calibration may include a process for identifying the first area according to the gaze direction of the user. Within the calibration, the wearable device 103 may display a visual object at an arbitrary position within a peripheral area focusing on the gaze direction (or point). The visual object may be referred to as a calibration object. For example, the wearable device 103 may obtain input of the user for the calibration object. For example, based on the input, the wearable device 103 may identify a range recognizable by the user with respect to the gaze direction. For example, the range may represent a border of the first area. For example, an area within the range may be referred to as the first area. Specific details associated with this are described in FIG. 7A below.

According to an embodiment, a size of the first area may be changed based on information obtained in operation 605. For example, the size of the first area may be changed based on biometric information included in the information or information representing whether the user moves. Specific details associated with this are described in FIG. 7B below.

According to an embodiment, in operation 605, the wearable device 103 may obtain information through the sensor 520 and the communication circuit 540. For example, the wearable device 103 may obtain the information through the sensor 520 and/or the communication circuit 540. For example, the information may be used to identify a context for the user or an object within a range recognizable by the wearable device 103. The context may include, for example, an activity that the user is engaged in.

The wearable device 103 may obtain an image of a peripheral area of the user worn by the wearable device based 103 on the sensor 520. For example, the wearable device 103 may obtain an image of the peripheral area through a camera included in the sensor 520. For example, the peripheral area may represent an omnidirectional of the user. The wearable device 103 may identify at least one object within the image based on the image of the peripheral area.

The wearable device 103 may obtain acoustic information of an area around the user based on the sensor 520. For example, the wearable device 103 may obtain the acoustic information through the microphone included in the sensor 520. For example, the acoustic information may include voice of the user. The wearable device 103 may identify the voice uttered by the user or a word (or sentence) necessary for the user based on the acoustic information.

The wearable device 103 may obtain biometric information of the user based on the sensor 520. For example, the wearable device 103 may obtain the biometric information based on the bio sensor included in the sensor 520. For example, the biometric information may include at least one of heart rate, body fat information, blood pressure, or pupil size of the user. The wearable device 103 may identify a context of the user by identifying health state of the user based on the biometric information. The wearable device 103 may identify the first area (or user gaze area) based on a gaze of the user based on the biometric information.

The wearable device 103 may identify a moving direction and a moving speed of the user, or a direction the user's head is facing, based on the sensor 520. For example, the wearable device 103 may identify the moving direction and the moving speed of the user, or the direction the user's head is facing based on the IMU sensor included in the sensor 520. The wearable device 103 may identify the first area (or user gaze area) based on a gaze of the user based on the moving direction and the moving speed of the user, or the direction the user's head is facing.

The wearable device 103 may identify position information of the wearable device 103, based on the sensor 520. For example, the wearable device 103 may identify the position information of the wearable device 103 based on GPS information. Or, for example, the wearable device 103 may identify current time information and temperature or atmospheric pressure information around the wearable device 103 based on the sensor 520.

The wearable device 103 may obtain communication information from another external electronic device connected through the communication circuit 540. For example, the communication circuit 540 may include a Wi-Fi module or a BT module. For example, the other external electronic device may include a router connected through a Wi-Fi module and a beacon connected through the BT module. For example, the communication information may include information about electronic devices connected to the router or the beacon. For example, the communication information may include a position of the electronic devices, information of the electronic devices (e.g., type, model name, and the like), information used by the electronic devices (e.g., traffic information, position information, and the like), and the position of the wearable device 103.

In operation 610, the wearable device 103 may identify a context of the user. For example, the wearable device 103 may identify the context and the object associated with the context, based on the information obtained through the sensor 520 and the communication circuit 540.

For example, the context may define an action or a situation of the user. For example, the context may be referred to as a routine, situation information, action that the user is engaged in, or a behavior pattern. In other words, the context may be defined so that the wearable device 103 interprets the behavior or the situation of the user and provides information or service needed by the user. For example, the context may include that the user moves on foot, that the user uses public transportation, that the user drives, that the user is watching a performance, that the user orders a menu at the restaurant, that the user cooks, and that the user is resting. However, an embodiment of the present disclosure is not limited thereto.

The wearable device 103 may identify the context further based on an application that the user is using through the wearable device 103. For example, in case that the user is using a map application, the wearable device 103 may identify the context as being associated with movement. Also, for example, in case that the user is using a public transportation search application, the context may be identified as being associated with using the public transportation. For example, when the user is using a recipe providing application, the context may be identified as being associated with cooking.

According to an embodiment, in operation 615, the wearable device 103 may identify an alarm object associated with the context. The alarm object may be identified among an object within a range recognizable by the wearable device 103 that identified based on the information. The object within the recognizable range may include an object positioned around the wearable device 103 (or the user). In other words, the alarm object may represent the object to be provided with notification information among the object. The alarm object may be referred to as the object associated with the context, the object of interest, a point of interest (POI), a visual element associated with the context, a visual object associated with the context, a graphic object associated with the context, or a target object.

The wearable device 103 may identify an object (i.e., the alarm object) associated with the context among the object based on the identified context representing the situation of the user. For example, in case that the context is moving toward a specific destination by walking or public transportation, the alarm object may include public transportation to be boarded, destination, obstacle, traffic light, crosswalks, and an external object with a risk of collision (e.g., bicycle). Also, in case that the context is vehicle driving, the alarm object may include a traffic light, nearby crosswalk situation on the route, and a blind spot of the vehicle. Also, in case that the context is a watching performance such as a musical and a play, the object may include an actor, a stage area, or an actor's line. Also, in case that the context is that a menu is ordered at a restaurant, the object may include completion of an order or a clerk, and the like.

The wearable device 103 may identify a priority for the alarm object. For example, the wearable device 103 may identify a priority for the alarm object based on the context. For example, the priority may represent an emergency level (or urgency) that defines an order in which notification information is provided among alarm objects associated with the context. According to an embodiment, in case that the priority of the alarm object is higher than or equal to a reference level, the wearable device 103 may display text describing the alarm object within the FoV of the wearable device 103. Specific details associated with this are described in FIG. 8B below.

The wearable device 103 may identify a notification function available with notification information on the alarm object. For example, the notification function may include an additional action different from the notification information displayed through the display 530 of the wearable device 103 and performed with a display of the notification information. For example, in case that the wearable device 103 is connected to a vehicle, the notification function may include vibration of a handle of the vehicle or a change in the seat position. However, an embodiment of the present disclosure is not limited thereto. For example, the notification function may include vibration of the wearable device 103 or blinking of a light emitting module included in the wearable device 103.

According to an embodiment, in operation 620, the wearable device 103 may identify whether the alarm object is visual information. The visual information may represent a type of the alarm object. For example, the type may include the visual information representing an image and non-visual information including text and voice. For example, in case that the alarm object is a traffic light, the type of the alarm object may be visual information. In contrast, in case that the alarm object is text notifying that the alarm object is a red signal, the alarm object may be non-visual information.

In operation 620, in case that the alarm object is the non-visual information, the wearable device 103 may perform operation 625. In contrast, in operation 620, in case that the alarm object is the visual information, the wearable device 103 may perform operation 630.

According to an embodiment, in operation 625, the wearable device 103 may provide notification information according to a type of an alarm object. For example, the wearable device 103 may provide notification information according to the type of the alarm object, based on identifying that the alarm object is the non-visual information. For example, the type may include text or voice. For example, in case that the non-visual information is text, the wearable device 103 may display a visual object representing the text through the display 530. The visual object representing the text may be displayed in a second area or the first area within the FoV of the wearable device 103. For example, the visual object in which the text is summarized may be displayed in the first area. In contrast, the visual object representing the text may be displayed within the second area. Specific details associated with this are described in FIG. 8B below. Also, in case that the non-visual information is a voice, the wearable device 103 may output the voice.

According to an embodiment, in operation 630, the wearable device 103 may identify whether a position of the alarm object is within the first area. The wearable device 103 may identify the position of the alarm object based on identifying that the alarm object is the visual information. In operation 630, based on identifying that the position is within the first area, the wearable device 103 may perform operation 635. In contrast, in operation 630, based on identifying that the position is outside the first area, the wearable device 103 may perform operation 640.

According to an embodiment, in operation 635, the wearable device 103 may provide a first visual effect, based on identifying that the position is within the first area. For example, the first visual effect may include display of a first visual object. For example, the first visual object may include a line corresponding to a periphery of an object 810 and having a designated thick. For example, the first visual object may be at least partially superimposed to the alarm object. However, an embodiment of the present disclosure is not limited thereto. For example, the first visual object may be displayed at a position spaced apart from the periphery of the alarm object by a designated length without being at least partially superimposed to the alarm object. The first visual effect according to an embodiment of the present disclosure is not limited to the first visual object. For example, the first visual effect may include displaying the alarm object by highlighting it through a first brightness. Also, for example, the first visual effect may include displaying an indicator having a first size indicating the alarm object in an area around the alarm object.

According to an embodiment, in operation 640, the wearable device 103 may identify whether a position of the alarm object is within a second area. For example, the second area may represent an area identified based on a field of view (FoV) of the wearable device 103. For example, the FoV may include the first area and the second area. For example, the second area may represent at least partial area of the FoV of the wearable device 103 distinguished from the first area. The second area may be referred to as a display area of the wearable device 103. For example, the wearable device 103 may identify whether the position of the alarm object is outside the first area and within the second area. In operation 640, in case of outside the first area and within the second area, the wearable device 103 may perform operation 645. In contrast, in operation 640, in case of outside the second area, the wearable device 103 may perform operation 650.

According to an embodiment, in operation 645, the wearable device 103 may provide a second visual effect. For example, the wearable device 103 may display the second visual effect based on identifying that the position is within the second area and outside the first area. The second visual effect may include blink of the first visual object. For example, the first visual object of the second visual effect may include a line corresponding to the periphery of the alarm object and having a designated thick. However, an embodiment of the present disclosure is not limited thereto. For example, the first visual object for the alarm object may be displayed at the position spaced apart from the periphery of the alarm object by a designated length, without being at least partially superimposed on with respect to the alarm object. For example, the first visual object of the second visual effect may be at least partially superimposed on with respect to the alarm object. At this time, the first visual object of the second visual effect may blink the designated number of times. However, the second visual effect according to an embodiment of the present disclosure is not limited to displaying and blinking of the first visual object. For example, the second visual effect may include highlighting and displaying the alarm object through a second brightness brighter than the first brightness. Also, for example, the second visual effect may include displaying an indicator having a second size greater than the first size indicating the alarm object in an area around the alarm object.

According to an embodiment, in operation 650, the wearable device 103 may provide a third visual effect. For example, the wearable device 103 may display the third visual effect based on identifying that the position is within the second area and outside the first area. In addition to the first area and the second area, the position may be understood as being positioned within a third area. For example, the third area may represent the area outside of the FoV and may represent the area within identifiable range based on information obtained by the wearable device 103. The third area 430 may be referred to as a recognition area of the wearable device 103 or an identification area of the wearable device 103.

The third visual effect may include a display of a second visual object. For example, the second visual object may include a rendered image representing the alarm object. For example, the user may not recognize the alarm object outside of the FoV, and only the wearable device 103 may recognize the alarm object. Also, since the alarm object is positioned outside of the FoV, it may not be displayed through a display of the wearable device 103. Accordingly, the wearable device 103 may display the second visual object, which is a rendered image for the alarm object, through a partial area of the FoV. For example, the partial area may represent an area within the FoV adjacent to the area outside of the FoV where the alarm object is positioned. For example, the partial area may be referred to as a corner of the FoV, an edge, a corresponding area of the FoV, an adjacent area, or an interest area. However, the third visual effect according to an embodiment of the present disclosure is not limited to the second visual object. For example, the third visual effect may further display of an indicator for representing the direction in which the alarm object is positioned, as well as the display of the second visual object.

According to an embodiment, in operation 655, the wearable device 103 may identify whether a position of the alarm object is changed to a position within the first area. For example, the wearable device 103 may identify whether the position within the second area or within the third area is changed to a position within the first area. For example, the wearable device 103 may identify whether a gaze of the user is changed to the position of the alarm object in a state in which the second visual effect or the third visual effect is displayed. This is because the second visual effect and the third visual effect are used to induce the user to look at the alarm object.

In operation 655, based on identifying that the position of the alarm object is changed to a position within the first area, the wearable device 103 may perform operation 660. In contrast, in operation 665, based on identifying that the position of the alarm object is not changed within the first area, the wearable device 103 may perform operation 665.

According to an embodiment, in operation 660, the wearable device 103 may cease providing a visual effect. For example, the wearable device 103 may cease displaying the second visual effect (or the third visual effect) based on identifying that the position of the alarm object is changed within the first area.

According to an embodiment, in operation 665, the wearable device 103 may change the brightness of the second area. For example, the wearable device 103 may lower the brightness of the second area based on identifying that the position of the alarm object is not changed to a position within the first area. Since the gaze attention of the user has not been drawn despite the display of the second visual effect (or the third visual effect), the wearable device 103 may lower the brightness of the second area. For example, the wearable device 103 may change the brightness of the second area from a first brightness to a second brightness lower than the first brightness.

The wearable device 103 may cause the user to look at the alarm object by changing the brightness of the second area.

Figure 7A:
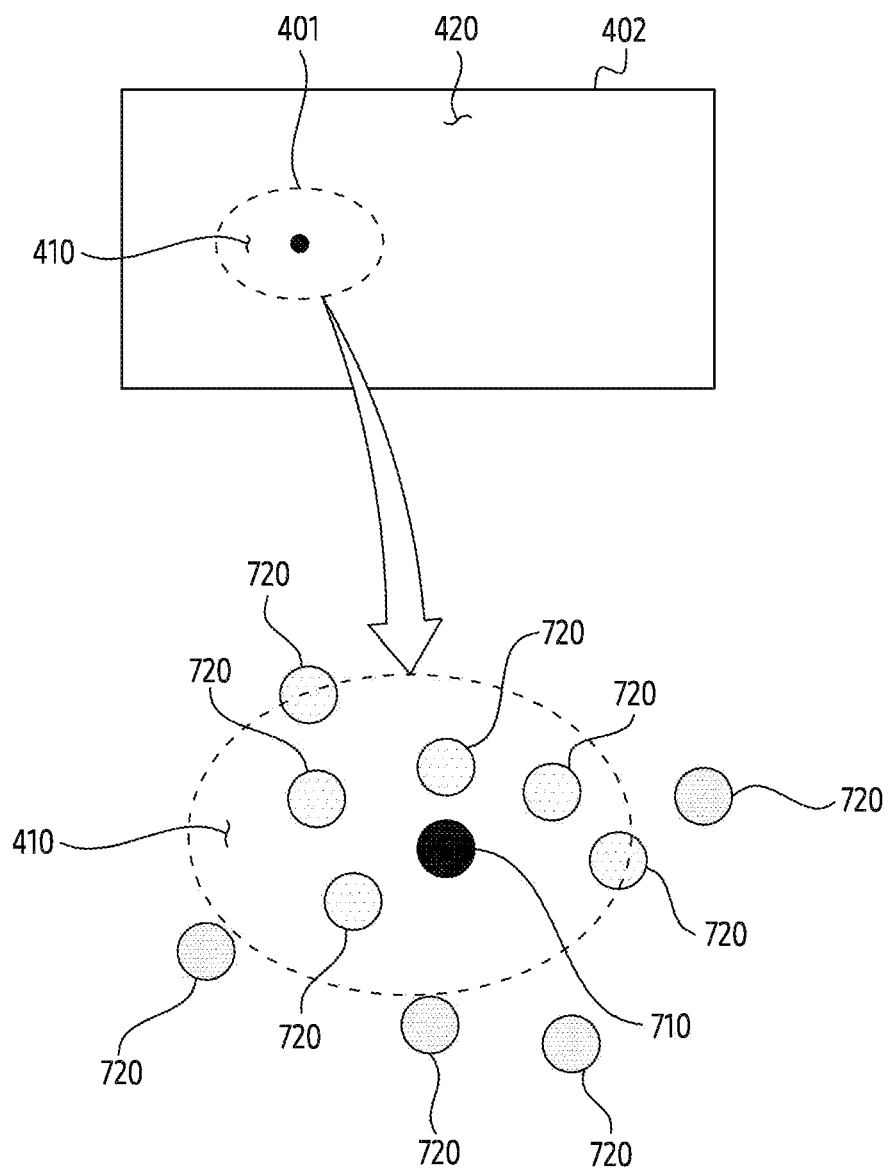
FIGS. 7A and 7B illustrate an example of a method of identifying a first area based on a gaze of a user.
Figure 7B:
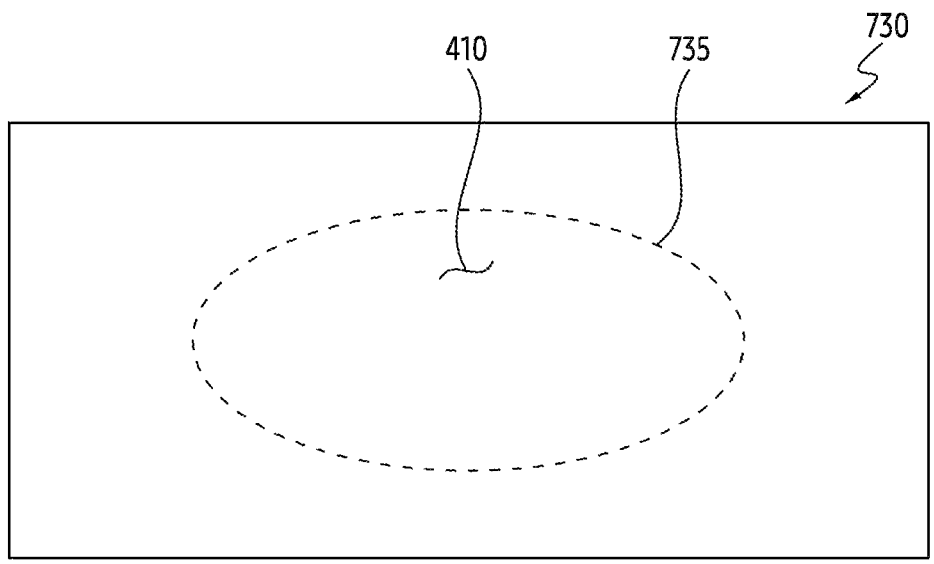
Figure 7B:
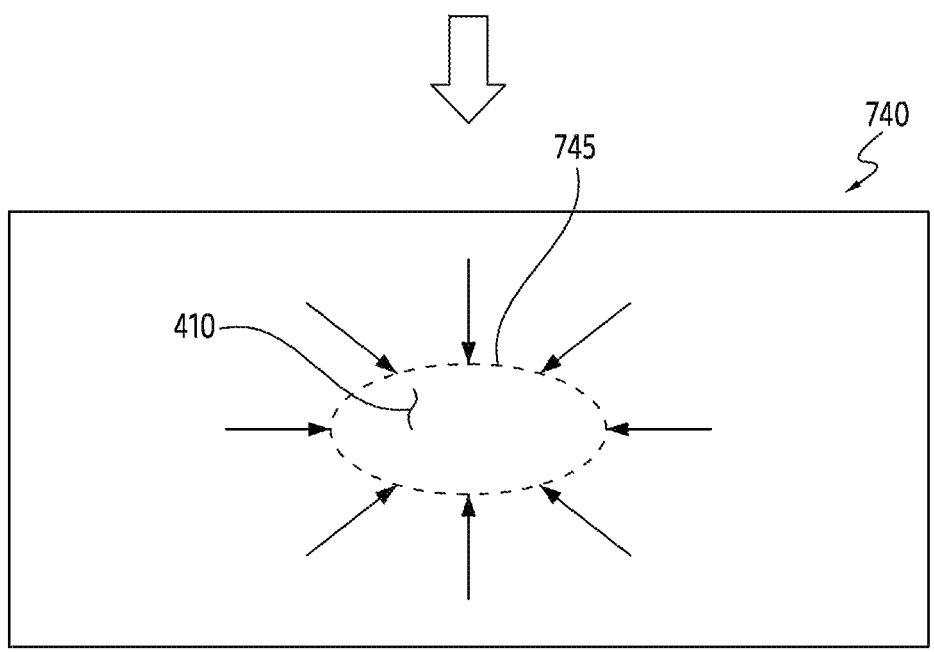

FIGS. 7A and 7B illustrate an example of a method of identifying a first area based on a gaze of a user.

The method of FIGS. 7A and 7B may be performed by a wearable device 103 of FIG. 5. For example, the user may represent a user of the wearable device 103. For example, a first area 410 may represent an area within a range 401 recognizable by the user identified based on a gaze of the user.

Referring to FIG. 7A, the wearable device 103 may perform calibration. For example, the wearable device 103 may perform the calibration for setting the first area. For example, the wearable device 103 may perform the calibration for setting a first area 410 within the FoV 402 of the wearable device 103. For example, the first area 410 may be identified based on the direction 710 indicated by a gaze of the user.

The wearable device 103 may display calibration objects 720 in performing the calibration. For example, the wearable device 103 may display the calibration objects 720 in a peripheral area of direction 710. FIG. 7A shows an example of displaying 10 calibration objects 720, for convenience of description, but the disclosure is not limited thereto. The wearable device 103 may obtain input of the user to the calibration objects 720. For example, the input may include a touch input, a point input, a drag input, a grip input or various gestures. For example, the input may be referred to as a user input. The wearable device 103 may obtain data of inputs to the calibration objects 720. For example, based on the data, the wearable device 103 may identify a range 401 that exceeds a designated reliability. The designated reliability may represent a level at which an object can be identified while the user is looking at a direction 710. The wearable device 103 may identify an area within the range 401 identified based on the calibration as a first area 410.

The size of the first area 410 may be set to a default size. For example, the default size of a first area 410 may be a value set when the wearable device 103 is produced. The wearable device 103 may set (or update) a first area 410 having a size for the user based on the calibration, from the default size.

In one or more embodiments, the wearable device 103 may determine a direction 710 that is gazed at by the user. The wearable device 103 can then place a plurality of calibration objects 720 at varying distances from the direction 710 and prompt the user to identify the calibration objects 720 by touching them. The first area 410 can be an area that corresponds to calibration objects 720 that are accurately identified by the user, or identified in excess of the designated reliability.

FIG. 7B illustrates examples 730 and 740 of a method of adjusting a first area 410 having a size set by the wearable device 103 based on the calibration. The example 730 may represent a first area 410 of the range 735 having a first size identified based on the calibration. In contrast, the example 740 may represent a first area 410 of a range 745 having a second size changed from the range 735 having the first size.

The wearable device 103 may set a first area 410 of a range 735 having the first size based on the calibration. The first area 410 of the range 735 having the first size may be set for the user. The wearable device 103 may change the first size to the second size based on the information obtained through a sensor and a communication circuit. For example, in case that the information is biometric information including a pupil size, the wearable device 103 may set the first size for a pupil having a first pupil size. Thereafter, in case that the size of the user's pupil is changed from the first pupil size to a smaller second pupil size, the wearable device 103 may identify the first area 410 of the range 745 having the second size reduced from the first size. Also, for example, in case that the information is information representing a movement state of the user, the wearable device 103 may set the first size for the user in a stationary state. Thereafter, in case that the user moves, the wearable device 103 may identify a first area 410 of the range 745 having the second size reduced from the first size. In the example, the case in which the change from the stationary state to the moving state was described, but an embodiment of the present disclosure is not limited thereto. For example, based on identifying the movement having a second movement speed faster than the first movement speed from the movement of the user having a first movement speed, the wearable device 103 may identify the range 745 having the second size from the range 735 having the first size. In other words, the size of a first area 410 may be set in inverse proportion to moving speed and acceleration of the user.

FIGS. 8A and 8B illustrate examples of visual effect provided according to a position and type of the object. In example 801, the object 810 is in the first area 410. In 802 and 803, the object 810 is in a second area 420.

FIGS. 8A and 8B illustrate examples 801, 802, 803, 804 of visual effect provided according to a position and type of the object. The object may represent an alarm object that is a target of notification information. For example, examples 801, 802, 803 illustrate visual effects provided according to a position of the object, in case that the object is visual information. Also, for example, an example 804 illustrates the visual effect in which a visual object representing the object is displayed, in case that the object is non-visual information (e.g.; text).

Each of examples 801, 802, 803, and 804 illustrates a first area 410, a second area 420, and a third area 430 of the wearable device 103. The first area 410 may be identified based on a range 401 area recognizable by a user of the wearable device. The second area 420 may be identified based on the FoV 402 of the wearable device 103. The third area 430 may be identified based on the range 403 recognizable by the wearable device 103 outside of the FoV 402.

Referring to an example 801, the wearable device 103 may identify that a position of an object 810 is within the first area 410. For example, the wearable device 103 may provide a first visual effect 820 based on identifying that the position is within the first area 410. For example, the first visual effect 820 may include display of a first visual object. For example, the first visual object may include a line corresponding to a periphery of an object 810 and having a designated thick. However, an embodiment of the present disclosure is not limited thereto. For example, the first visual object 820 may include a display of an indicator indicating the object 810 at the top of the object 810.

The wearable device 103 may perform hand tracking. For example, the wearable device 103 may identify a position of a hand (or finger) of the user of wearable device 103. The wearable device 103 may identify that a position of a hand (or a virtual object corresponding to the hand) of the user corresponding to a hand of the user is positioned within a first area. For example, in case that the hand of the user is positioned in the first area 410, the wearable device 103 may refrain from providing a visual effect with respect to an object positioned in a portion area within the first area 410 where the hand is positioned. In the example 801, in case that the hand is at least partially superimposed on the position of the object 810, the wearable device 103 may refrain from displaying the first visual object. However, the present disclosure is not limited thereto. For example, in case that the hand is at least partially superimposed on the position of the object 810, the wearable device 103 may display the first visual object having a thick thinner than the designated thick with respect to the first visual object having the designated thick. In other words, in case that the position of the hand identified by the hand tracking is positioned within the first area 410, the wearable device 103 may provide a lower level of visual effect than the first visual effect 820.

Referring to an example 802, the wearable device 103 may identify that a position of the object 810 is within the second area 420. For example, the wearable device 103 may provide a second visual effect 830 based on identifying that the position is within the second area 420. For example, the second visual effect 830 may include display of the first visual object and blink of the displayed first visual object. For example, the first visual object may include a line corresponding to a periphery of the object and having a designated thick. For example, the second visual effect 830 object may blink the designated number of times (or for a designated time). The second visual effect 830 including the blink may more effectively attract the user's attention compared to the first visual effect 820. However, the present disclosure is not limited thereto. For example, the second visual effect 830 may include a display of an indicator indicating the object 810 at the top of the object 810 and blink of the displayed indicator. Also, for example, the second visual effect 830 may include the display of the first visual object on the object 810 and the display of a dotted line extending from the position of a gaze of the user to the object 810.

Referring to an example 803, a wearable device 103 may identify that a position of an object 810 is within a third area 430. For example, the wearable device 103 may provide a third visual effect 840 based on identifying that the position is within a third area 430. For example, a third visual effect 840 may include a display of a second visual object representing the object 810. For example, the second visual object may indicate an image in which the object 810 is rendered. The second visual object may be displayed in a partial area 850 of a FoV 402. For example, the partial area 850 may represent an area adjacent to the position among the area of the FoV. In the example 803 of FIG. 8A, since the object 810 is positioned at a right upper end within a third area 430 with respect to the FoV 402, and the partial area 850 may be at the right upper end of the FoV 402. Also, for example, the third visual effect 840 may include blink of the partial area 850 along with the display of the second visual object. Also, for example, a third visual effect 840 may further display an indicator (e.g., an arrow) for representing the position of the object 810 with the display of the second visual object. For example, the user may not recognize the object 810 outside of the FoV 402, and only the wearable device 103 may recognize the object 810. Also, since the object 810 is positioned outside of the FoV 402, it may not be displayed through a display 530 of the wearable device 103. Accordingly, the wearable device 103 may display an image rendered by the second visual object corresponding to the object 810. However, an embodiment of the present disclosure is not limited thereto. For example, a third visual effect 840 may include adjusting resolution within the second visual object and the partial area 850 to correspond to resolution of a first area 410. For example, in the wearable device 103 providing VR, the wearable device 103 may display by rendering an image having relatively high resolution with respect to the first area 410 in which a gaze of the user is positioned. Also, the wearable device 103 may adjust resolution lower as it moves away from the gaze. A method of adjusting resolution described above may be referred to as foveated rendering. The wearable device 103 may adjust resolution of the second visual object and the partial area 850 to correspond to resolution of a first area 410. For example, the third visual effect 840 may output the display or voice of a text describing the object 810. For example, the text may be displayed within another partial area of the FoV 402 or a first area 410. For example, the text displayed within a first area 410 may be in a state in which description of the object 810 is simplified. For example, in case that the text displayed in the other partial area of a FoV 402 is "the traffic light in front is red", the text displayed within a first area 410 may be "stop signal". For the example in which the text is displayed, an example 804 of FIG. 8B may be referred below.

Referring to the example 804, the wearable device 103 may identify whether a type of an object is the non-visual information. For example, the wearable device 103 may display text describing the object based on identifying the object which is the non-visual information. For example, the wearable device 103 may display text 860 describing by summarizing the object within the first area 410. Or, for example, the wearable device 103 may display text 870 describing the object within the second area 420. In the example of FIG. 8B, in case that the text 870 is "the traffic light in front is red", the text 860 may be "stop signal". Also, as described in the example 803 of the FIG. 8A, the wearable device 103 may display text 860 and text 870 together with the second visual object, based on identifying a position of the object within the third area 430. However, an embodiment of the present disclosure is not limited thereto. For example, the wearable device 103 may display only the text 870 and display an indicator representing the position of the text 870 instead of the text 860.

In one or more embodiments, the context can include driving. For example, the context can include an action that the user is engaged in, and the user can be engaged in driving.

FIG. 9A illustrates an example of a recognition area identified when a user wearing a wearable device uses a vehicle.

FIG. 9A illustrates an example 900 of an area recognized by an external electronic device 570 connected to the wearable device 103. For example, the external electronic device 570 may include a vehicle. For example, the external electronic device 570 may be connected to the wearable device 103 through a communication circuit 571. For example, the external electronic device 570 may be in a state in which the user wearing the wearable device 103 is on board.

In an example 900, a method of synchronizing an area 930 recognized by the external electronic device 570 and an area recognized by the user wearing a wearable device 103 (e.g., a FoV 402 including a first area 410 and a second area 420) is illustrated. For example, the first area 410 may be identified based on a range 401 recognizable by the user of the wearable device 103. The second area 420 may be identified based on the FoV 402 of the wearable device 103.

The area 930 may represent an area within a recognizable range 903 based on information obtained by the external electronic device 570. The information may include information on the periphery of the vehicle obtained through a sensor 573 of the external electronic device 570 and/or a communication circuit 571. For example, the area 930 may be referred to as a recognition area of the external electronic device 570 (or vehicle). The area 930 may be identified based on the information around the vehicle. For example, the information around the vehicle may include surrounding traffic information, pedestrian information, and driving-related information (e.g., moving speed, direction) obtained based on the communication circuit 571 and the sensor 573 of the external electronic device 570.

The external electronic device 570 may receive FoV information and gaze information from the wearable device 103. For example, the FoV information may include information on the FoV 402 of the wearable device 103. For example, the gaze information may include information representing the position of a gaze of the user of the wearable device 103 and information on the range 401. For example, the FoV information and the gaze information may include an image. Accordingly, the external electronic device 570 may identify (or detect) a first area 410 and a second area 420.

The external electronic device 570 may map an identified first area 410, a second area 420, and the area 930. For example, the external electronic device 570 may synchronize a first area 410, a second area 420, and the area 930. Referring to FIG. 9A, the first area 410 and the second area 420 may be included within a wind shield 910 of the external electronic device 570. The example 900 of FIG. 9A illustrates a situation in which the user is driving, a first area 410 and a second area 420 may be positioned within the wind shield 910 positioned in front of the external electronic device 570. However, an embodiment of the present disclosure is not limited thereto. Also, the wind shield 910 may be a narrower area than the area 93 recognizable by the external electronic device 570.

The external electronic device 570 may identify the context of the user and the object of the wearable device 103. The object may be an object associated with the context. For example, the object may be referred to as a notification object. The external electronic device 570 may identify the context by obtaining information on the context identified by the wearable device 103. However, an embodiment of the present disclosure is not limited thereto. For example, the external electronic device 570 may identify the context of the user based on the information around the vehicle obtained by the external electronic device 570 through the sensor 573 and the communication circuit 571.

The external electronic device 570 may identify the object by receiving information on the object from the wearable device 103. However, an embodiment of the present disclosure is not limited thereto. For example, the external electronic device 570 may identify the object based on the information around the vehicle obtained by the external electronic device 570 through the sensor 573 and the communication circuit 571.

The external electronic device 570 may identify the position of the notification object. For example, the external electronic device 570 may identify that the position of the notification object is positioned outside of the FoV 402 and within the area 930.

The external electronic device 570 may provide notification (or a notification function) for the object based on identifying the position within the area 930. For example, the notification may include at least one of the visual object represented through the display on the wind shield 910 of the vehicle, vibration by a handle of the vehicle, the visual object represented through another display disposed in the vehicle, movement of a seat positioned in the vehicle by the user, or acoustic provided through a speaker of the vehicle. The display on the wind shield 910 may include a head up display (HUD). For example, the other display disposed in the vehicle may include a display including a dashboard of the vehicle or a display for adjusting setting of the vehicle.

According to an embodiment, based on identifying the position in the area 930, the external electronic device 570 may transmit, to the wearable device 103, a signal indicating the display of the visual object for notifying the object. For example, the signal may indicate displaying the visual object for notifying the object positioned within the area 930 in partial area of the FoV 402 of the wearable device 103. The wearable device 103 may display the object in the partial area based on receiving the signal. For example, the wearable device 103 may provide a third visual effect (e.g., a third visual effect 840 in FIG. 8A). For example, the third visual effect may include a rendered image corresponding to the object.

FIG. 9B illustrates an example of a wearable device that provides notification information based on information provided from a vehicle.

FIG. 9B illustrates examples 950 and 960 of a method of providing the notification information based on a signal received from an external electronic device 570 (e.g., the vehicle) of FIG. 9A.

Referring to the example 950, the wearable device 103 may provide a navigation function. For example, the wearable device 103 may provide a visual object 953 representing a route to a destination based on execution of an application for the navigation function. The wearable device 103 may identify a context representing a situation of the user based on identifying that the software application is being executed. For example, the context may include driving. For example, based on the identified context, the wearable device 103 may identify the visual object 953 representing the route as an alarm object. Also, a pedestrian 955 may be identified as the object (or the alarm object) associated with the driving but the wearable device 103 may not identify the pedestrian 955 outside of a FoV 402. At this time, the external electronic device 570 connected to the wearable device 103 may identify the pedestrian 955 positioned in the area 930 within the recognizable range 903. The external electronic device 570 may identify the FoV 402 of the wearable device 103 and a first area 410 based on a gaze of the user, and transmit, to the wearable device 103, a signal for indicating a display of the visual object for notifying the pedestrian 955.

Referring to the example 960, in an embodiment, the wearable device 103 may receive a signal for indicating a display of a visual object 965 from the external electronic device 570 connected to the wearable device 103. For example, the wearable device 103 may perform the display of the visual object 965 based on the signal. At this time, the wearable device 103 may display the visual object 965 within a first area 410. For example, a first area 410 of the example 960 may be different from a first area 410 of the example 950. This is because the gaze of the user may be changed in real-time. Therefore, the wearable device 103 may display the visual object 965 for notifying the pedestrian 955 within a first area 410 where the gaze of the user is positioned. For example, the visual object 965 may include a text for notifying the pedestrian 955. Referring to the described above, while driving the external electronic device 570 in a state of wearing the wearable device 103, the user may recognize information on the pedestrian 955 which becomes the alarm object for the driving, and perform the safer driving.

In FIG. 9B, a method of providing information to the user on an object (or the alarm object) within an area (e.g., area 930) that is difficult for the wearable device 103 to recognize, based on the signal received from the external electronic device 570 is described. However, an embodiment of the present disclosure is not limited thereto. For example, even in a state of not being connected to the external electronic device 570, the wearable device 103 may identify an object within a second area 420 outside of a first area 410 of the user and display a visual object for providing information on the object within a first area 410. For example, the wearable device 103 may identify the pedestrian positioned within a second area 420 of the FoV 402 as the alarm object based on the context of the user driving the vehicle. As in the example 950, the wearable device 103 may identify a first area 410 on the visual object 953 representing the route. At this time, the wearable device 103 may identify that it is necessary to provide information on the pedestrian outside of the first area 410. Thereafter, the wearable device 103 may identify the first area 410 on the changed position of the example 960, and display the visual object 965 for notifying information on the pedestrian in the first area 410 on the changed position within the first area 410. Accordingly, the user wearing the wearable device 103 may recognize the pedestrian within the FoV 402 more quickly and perform safer driving.

In one or more embodiments, the external electronic device may comprise an IoT device.

FIGS. 10A and 10B illustrate an example of a method of providing notification information based on a space in which an external electronic device is positioned.

FIG. 10A illustrates an example 1000 representing a space in which the external electronic device is positioned based on information provided from a server 580 connected to a wearable device 103. For example, the external electronic device may include an IoT device connected to the server 580. For example, the server 580 may represent the external electronic device that manages the IoT device. For example, the notification information may be an object (or notification object) associated with a context representing a situation of the user wearing the wearable device 103. For example, the context may include control of the IoT device of the user.

Referring to the example 1000, the wearable device 103 may be connected to the server 580. For example, the wearable device 103 may be connected to the server 580 through a communication circuit 540. For example, the server 580 may be connected to a first IoT device 1003 and a second IoT device 1005. FIG. 10A illustrates the example of the server 580 connected to two IoT devices, but an embodiment of the present disclosure is not limited thereto. For example, the server 580 may be connected to one IoT device or three or more IoT devices. For example, a first IoT device 1003 may be positioned in the same space 1010 as the wearable device 103. In contrast, a second IoT device 1005 may be positioned in a space 1020 different from the space 1010 in which the wearable device 103 is positioned.

The wearable device 103 may obtain information on a first IoT device 1003 and a second IoT device 1005 from the server 580. For example, the information on the first IoT device 1003 may include at least one of an image representing appearance of the first IoT device 1003, a model name of the first IoT device 1003, a current position (e.g., space 1010) of the first IoT device 1003 or an event occurring in the first IoT device 1003. For example, the information on the second IoT device 1005 may include at least one of the image representing appearance of the second IoT device 1005, the model name of the second IoT device 1005, the current position (e.g., space 1020) of the second IoT device 1005, or the event occurring in the second IoT device 1005.

The wearable device 103 may obtain a floor plan for a space in which the wearable device 103 is positioned from the server 580. For example, the wearable device 103 may identify that the space where the wearable device 103 is positioned (e.g., space 1010) and a space where the first IoT device 1003 is positioned (e.g., space 1010) are the same based on the obtained floor plan and a current position of the first IoT device 1003. Also, for example, the wearable device 103 may identify that the space where the wearable device 103 is positioned (e.g., space 1010) and the space where a second IoT device 1005 is positioned (e.g., space 1020) are different based on the obtained floor plan and a current position of the second IoT device 1005. However, an embodiment of the present disclosure is not limited thereto. For example, based on the floor plan stored by the server 580, position information of the first IoT device 1003, and position information of the second IoT device 1005, the server 580 may identify whether the space where the wearable device 103 is positioned (e.g., space 1010) and the space where the first IoT device 1003 (or a second IoT device 1005) are positioned are the same or different. The server 580 may transmit information on an identified identity of the space to the wearable device 103. For example, the event occurred in the first IoT device 1003 or the second IoT device 1005 may include execution, suspension, termination of a specific function, or identification of a trigger for execution of a new function. However, an embodiment of the present disclosure is not limited thereto.

FIG. 10B illustrates an example 1050 in which the user recognizes the first IoT device 1003 or the second IoT device 1005 through the wearable device 103. The example 1050 illustrates the example in which the first IoT device 1003 is positioned within a first area 410 based on a gaze of the user identified by the wearable device 103, but an embodiment of the present disclosure is not limited thereto. For example, the first IoT device 1003 may be positioned in a second area 420 or a third area 430 even when it is positioned in the same space 1010 as the wearable device 103 is positioned. An embodiment of the present disclosure may also be applied when positioned in a second area 420 or a third area 430 within the same space 1010 as the wearable device 103.

Referring to the example 1050, the wearable device 103 may display the first IoT device 1003 within the first area 410. The wearable device 103 may provide a first visual effect 1060 for the first IoT device 1003, which is an object associated with a context of the user. For example, the first visual effect 1060 may include display of the first visual object. For example, the first visual object may include a line corresponding to a periphery of the first IoT device 1003 and having a designated thick. For example, the first visual object may be at least partially superimposed on with respect to the first IoT device 1003. However, a first visual effect 1060 according to an embodiment of the present disclosure is not limited to the first visual object.

Also, referring to the example 1050, The wearable device 103 may identify the second IoT device 1005 within the third area 430. For example, the wearable device 103 may identify a second IoT device 1005 positioned in the space 1020 within the third area 430. The wearable device 103 may provide a third visual effect 1065 based on identifying that the second IoT device 1005, which is an object associated with the context of the user, is positioned within the third area 430 outside of the FoV 402. For example, the third visual effect 1065 may include a display of the second visual object. For example, the second visual object may include a rendered image representing the second IoT device 1005. The wearable device 103 may display the second visual object, which is a rendered image for the second IoT device 1005, through a partial area of the FoV 402. For example, the partial area 1070 may represent the area within the FoV 402 adjacent to the area outside of the FoV 402 where the second IoT device 1005 is positioned. In the example 1050 of FIG. 10B, the partial area 1070 may include an upper right end. In this case, the second IoT device 1005 may be positioned within the space 1020 positioned in the upper right direction on the basis of the space 1010 in which the user is positioned. The third visual effect 1065 may include the display of the second visual object and the display of the visual object 1075 rendered with respect to the space 1020. For example, the visual object 1075 rendered for the space 1020 may be a background image for the second visual object. However, the third visual effect 1065 according to an embodiment of the present disclosure is not limited to the second visual object. For example, a third visual effect 1065 may further include the display of an indicator for representing the direction in which a second IoT device 1005 is positioned as well as the display of the second visual object.

Referring to FIGS. 10A and 10B, the wearable device 103 may identify an IoT device as an object associated with the context through the connected server 580. The wearable device 103 may identify the position of the IoT device based on information obtained from the server 580. The wearable device 103 may increase the user's awareness of the object by providing a visual effect according to a position of the IoT device.

Figure 11:
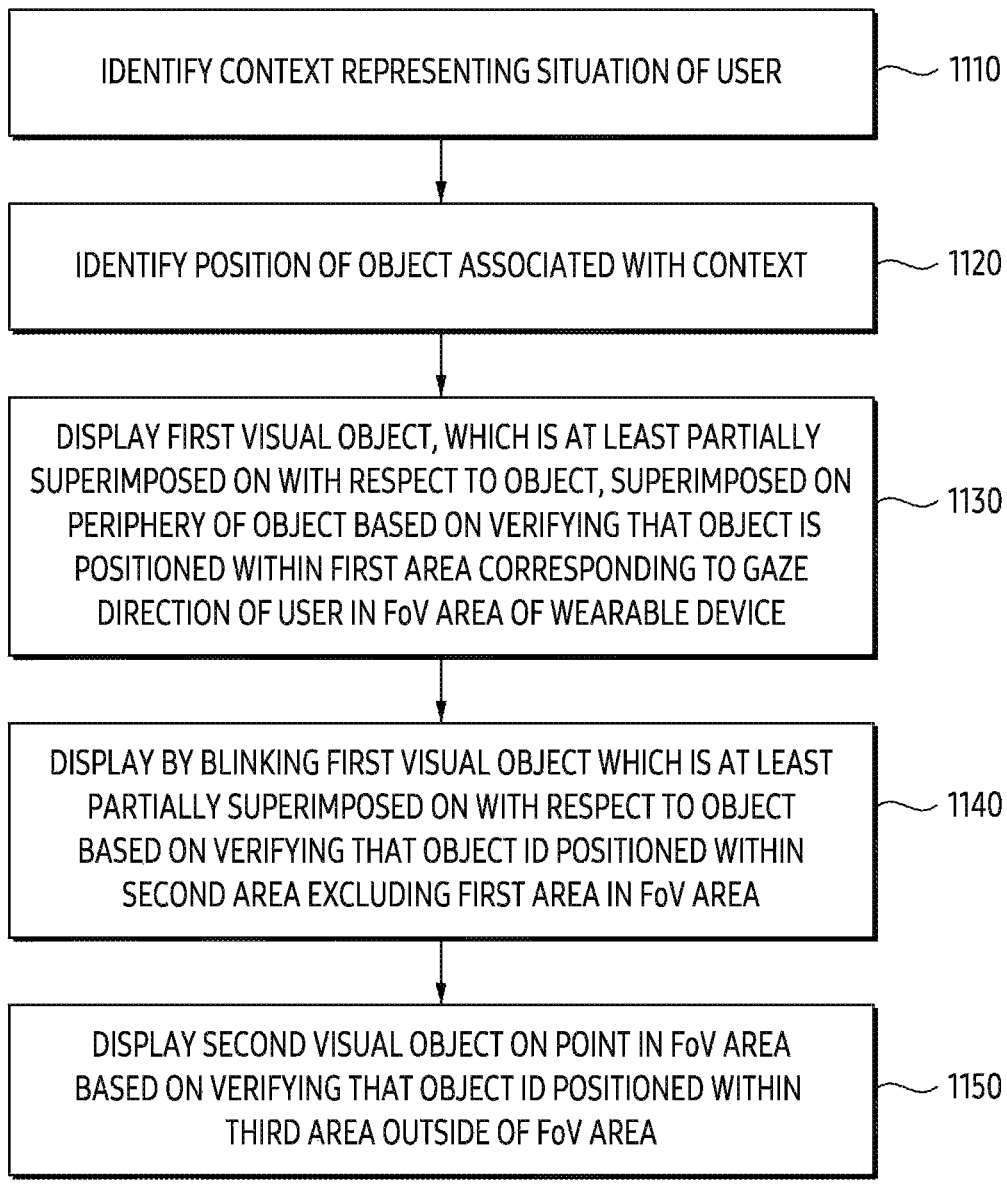
FIG. 11 illustrates an example of operation flow for a method of providing notification information based on a position of an object.

FIG. 11 illustrates an example of operation flow for a method of providing notification information based on a position of an object.

At least portion of the method of FIG. 11 may be performed by the wearable device 103 of FIG. 5. For example, at least portion of the method may be controlled by a processor 510 of the wearable device 103.

Referring to FIG. 11, in operation 1110, the wearable device 103 may identify a context representing a situation of the user, such as, among other things, an action that the user is engaged in. The user may represent the user wearing the wearable device 103. For example, the context may define an action or a situation of the user. For example, the context may be referred to as a routine, situation information, action that the user is engaged in, or a behavior pattern. In other words, the context may be defined so that the wearable device 103 interprets the behavior or the situation of the user and provides information or service needed by the user. For example, the context may include that the user moves on foot, that the user uses public transportation, that the user drives, that the user is watching a performance, that the user orders a menu at the restaurant, that the user cooks, and that the user is resting. However, an embodiment of the present disclosure is not limited thereto.

Although not illustrated in FIG. 11, the wearable device 103 may execute an application that provides extended reality. Hereinafter, for convenience of description, augmented reality will be described as the basis, but an embodiment of the present disclosure may be applied to virtual reality or mixed reality. For example, the wearable device 103 may identify whether a function providing the notification information is set based on the position of the object within a state in which the software application is executed. For example, the function of providing the notification information based on the position of the object may be activated or deactivated in a global setting of the wearable device 103 or in a setting within the software application. In other words, in case that the function is activated, the wearable device 103 may provide the notification information based on the position of the object described below.

The wearable device 103 may identify a first area based on a gaze of the user. For example, the wearable device 103 may perform calibration for identifying the first area. The calibration may include a process for identifying the first area according to the gaze direction of the user. Within the calibration, the wearable device 103 may display the visual object at an arbitrary position within a peripheral area focusing on the gaze direction (or point). The visual object may be referred to as a calibration object. For example, the wearable device 103 may obtain input of the user for the calibration object. For example, based on the input, the wearable device 103 may identify a range recognizable by the user with respect to the gaze direction. For example, the range may represent a border of the first area. For example, the within of the range may be referred to as the first area. The size of the first area may be changed based on information obtained through a sensor 520 and a communication circuit 540. For example, the size of the first area may be changed based on biometric information included in the information or information representing whether the user moves. As for specific details associated with this, content described in the FIG. 7A may be substantially applied.

The wearable device 103 may obtain information through the sensor 520 and the communication circuit 540. For example, the wearable device 103 may obtain the information through the sensor 520 and/or the communication circuit 540. For example, the information may be used to identify the context representing the situation of the user or the object within the range recognizable by the wearable device 103.

The wearable device 103 may obtain an image of a peripheral area of the user worn by the wearable device 103 based on the sensor 520. For example, the wearable device 103 may obtain the image of the peripheral area through a camera included in the sensor 520. For example, the peripheral area may represent an omnidirectional of the user. The wearable device 103 may identify at least one object within the image based on the image of the peripheral area.

The wearable device 103 may obtain acoustic information of an area around the user based on the sensor 520. For example, the wearable device 103 may obtain the acoustic information through the microphone included in the sensor 520. For example, the acoustic information may include voice of the user. The wearable device 103 may identify the voice uttered by the user or a word (or a sentence) necessary for the user based on the acoustic information.

The wearable device 103 may obtain biometric information of the user based on the sensor 520. For example, the wearable device 103 may obtain the biometric information based on the bio sensor included in the sensor 520. For example, the biometric information may include at least one of heart rate, body fat information, blood pressure, or pupil size of the user. The wearable device 103 may identify the context of the user by identifying health state of the user based on the biometric information. The wearable device 103 may identify the first area (or user gaze area) based on the gaze of the user based on the biometric information.

According an embodiment, the wearable device 103 may identify a moving direction and a moving speed of the user, or a direction the user's head is facing, based on the sensor 520. For example, the wearable device 103 may identify the moving direction and the moving speed of the user, or the direction the user's head is facing based on a IMU sensor included in the sensor 520. The wearable device 103 may identify the first area (or user gaze area) based on the gaze of the user based on the moving direction and the moving speed of the user, or the direction the user's head is facing.

The wearable device 103 may identify position information of the wearable device 103 based on the sensor 520. For example, the wearable device 103 may identify the position information of the wearable device 103 based on GPS information. Or, for example, the wearable device 103 may identify current time information and temperature or atmospheric pressure information around the wearable device 103 based on the sensor 520.

The wearable device 103 may obtain communication information from another external electronic device connected through a communication circuit 540. For example, the communication circuit 540 may include a Wi-Fi module or a BT module. For example, the other external electronic device may include a router connected through the Wi-Fi module and a beacon connected through the BT module. For example, the communication information may include information about electronic devices connected to the router or the beacon. For example, the communication information may include the position of the electronic devices, information of the electronic devices (e.g., type, model name, and the like), information used by the electronic devices (e.g., traffic information, position information, and the like), and the position of the wearable device 103.

In operation 1110, the wearable device 103 may identify the context representing the situation of the user. For example, the wearable device 103 may identify the context representing the situation of the user based on the information obtained through the sensor 520 and the communication circuit 540. The wearable device 103 may identify the context further based on the software application that the user is using through the wearable device 103. For example, in case that the user is using a map application, the wearable device 103 may identify the context as being associated with movement. Also, for example, in case that the user is using a public transportation search application, the context may be identified as being associated with using the public transportation. For example, when the user is using a recipe providing application, the context may be identified as being associated with cooking.

In operation 1120, the wearable device 103 may identify the position of the object associated with the context. The object associated with the context may be identified among at least one object within the range recognizable by the wearable device 103 that identified based on the information. For example, the wearable device 103 may identify the position of the object associated with the identified context. The object associated with the context may represent the object to be provided with notification information among the at least one object, the object associated with the context may be referred to as the alarm object, the object of interest, a point of interest (POI), a visual element associated with the context, a visual object associated with the context, a graphic object associated with the context, or a target object.

The wearable device 103 may identify the object (i.e., the alarm object) associated with the context among the surrounding object based on the identified context representing the situation of the user. For example, in case that the context moves toward a specific destination through walking on foot or public transportation, the alarm object may include public transportation to be boarded, destination, obstacle, traffic light, crosswalks, and an external object with a risk of collision (e.g., bicycle). Or, in case that the context is vehicle driving, the alarm object may include a traffic light, nearby crosswalk situation on the route, and a blind spot of the vehicle. Or, in case that the context is a watching performance such as a musical and a play, the object may include an actor, a stage area, or an actor's line. Or, in case that the context is that a menu is ordered at a restaurant, the object may include completion for order or a clerk, and the like.

The wearable device 103 may identify a priority for the alarm object. For example, the wearable device 103 may identify the priority for the alarm object based on the context. For example, the priority may represent an emergency level (or urgency) that defines an order in which notification information is provided among the alarm objects associated with the context. According to an embodiment, in case that the priority of the alarm object is higher than or equal to a reference level, the wearable device 103 may display text describing the alarm object within the FoV of the wearable device 103. The specific content associated with this may be applied substantially the same as the contents described in FIG. 8B.

According to an embodiment, a wearable device 103 may identify a notification function available with notification information on the alarm object. For example, the notification function may include an additional action different from the notification information displayed through a display 530 of the wearable device 103 and performed with the display of the notification information. For example, in case that the wearable device 103 is connected to the vehicle, the notification function may include vibration of a handle of the vehicle or a change in the seat position. However, an embodiment of the present disclosure is not limited thereto. For example, the notification function may include the vibration of the wearable device 103 or blinking of a light emitting module included in the wearable device 103.

In operation 1130, the wearable device 103 may display a first visual object, which is at least partially superimposed on with respect to the object and superimposed on a periphery of the object, based on verifying that the object is positioned within the first area corresponding to the gaze direction of the user in a field of view (FoV) area of the wearable device 103. For example, the wearable device 103 may provide a first visual effect based on identifying that the position of the object associated with the context is within the first area. The first visual effect may include the display of the first visual object.

For example, the first visual object may include a line corresponding to a periphery of the alarm object and having a designated thick. For example, the first visual object may be at least partially superimposed on with respect to a defrost alarm object. However, the first visual effect according to an embodiment of the present disclosure is not limited to the first visual object.

In operation 1140, the wearable device 103 may display by blinking the first visual object which is at least partially superimposed on with respect to the object, based on verifying that the object is positioned within the second area excluding the first area in the FoV area of the wearable device 103. For example, the wearable device 103 may provide a second visual effect based on identifying that the position of the object associated with the context is within the second area. For example, the FoV area may include the first area and the second area. For example, the second area may represent at least a partial area of the FoV area of the wearable device 103 distinguished from the first area. The second area may be referred to as the display area of the wearable device 103.

For example, the second visual effect may include blink of the first visual object. For example, the first visual object of the second visual effect may include a line corresponding to the periphery of the alarm object and having a designated thick. For example, the first visual object of the second visual effect may be at least partially superimposed on with respect to the alarm object. At this time, the first visual object of the second visual effect may blink the designated number of times. However, the second visual effect according to an embodiment of the present disclosure is not limited to displaying and blinking of the first visual object.

In operation 1150, the wearable device 103 display a second visual object representing the object on a point in the FoV area based on verifying that the object is positioned within a third area outside of the FoV area. For example, the third area may represent the area outside of the FoV area of the wearable device 103 and may represent the area within an identifiable range based on information obtained by the wearable device 103. The third area may be referred to as a recognition area of the wearable device 103 or an identification area of the wearable device 103.

The third visual effect may include the display of the second visual object. For example, the second visual object may include the rendered image representing the alarm object. For example, the wearable device 103 may display the second visual object, which is the rendered image for the alarm object, through a point of the FoV area. For example, the point may represent the area within the FoV adjacent to the area outside of the FoV where the alarm object is positioned. For example, the point may be referred to as a corner of the FoV, an edge, a corresponding area of the FoV, an adjacent area, or an interest area. However, the third visual effect according to an embodiment of the present disclosure is not limited to the second visual object. For example, the third visual effect may further display of an indicator for representing the direction in which the alarm object is positioned as well as the display of the second visual object.

Although not illustrated in FIG. 11, the wearable device 103 may identify whether the position of the object is changed within the first area. For example, the wearable device 103 may identify whether the position within the second area or within the third area is changed within the first area. For example, the wearable device 103 may identify whether the gaze of the user is changed to the position of the alarm object in a state in which the second visual effect or the third visual effect is displayed. This is because the second visual effect and the third visual effect are the visual effect used to keep the user's eye on the alarm object. The wearable device 103 may cease displaying the second visual effect (or the third visual effect) based on the change the position of the object being changed within the first area. For example, the wearable device 103 may lower the brightness of the second area based on identifying that the position of the alarm object is not changed within the first area. Despite the display of the second visual effect (or the third visual effect), the gaze attention of the user has not been drawn, the wearable device 103 may lower the brightness of the second area. For example, the wearable device 103 may change the brightness of the second area from a first brightness to a second brightness lower than the first brightness. Changing the brightness of the second area may cause the user to look at the alarm object.

Figure 12:
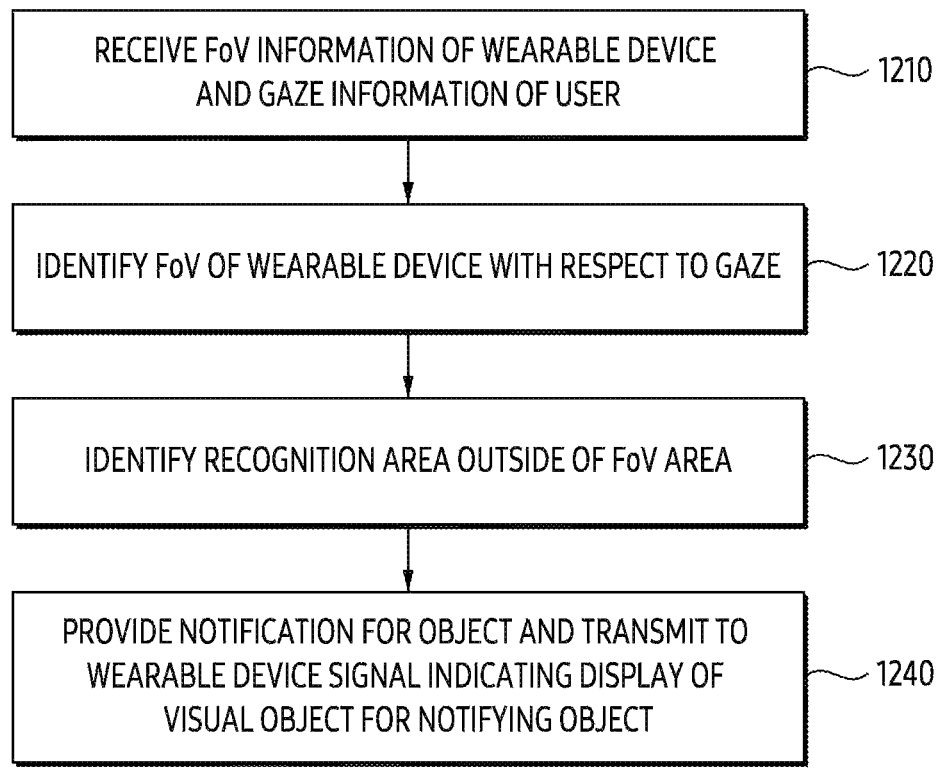
FIG. 12 illustrates an example of operation flow for a method of providing notification information based on a position of an object and transmitting a signal to an external electronic device.

FIG. 12 illustrates an example of operation flow for a method of providing notification information based on a position of an object and transmitting a signal to an external electronic device.

At least a portion of the method of FIG. 12 may be performed by the external electronic device 570 of FIG. 5. For example, at least a portion of the method may be controlled by a processor 577 of the external electronic device 570. For example, the external electronic device 570 may include a vehicle, and the context can include the user's driving.

Referring to FIG. 12, in operation 1210, the external electronic device 570 may receive a FoV information of the wearable device 103 and gaze information of a user. For example, the external electronic device 570 may be connected to the wearable device 103. For example, the user may be wearing the wearable device 103 and in a state of boarding the external electronic device 570. For example, the FoV information may include information on the FoV (e.g., FoV 402 of FIG. 9A) (or FoV area) of the wearable device 103. For example, the gaze information may include information representing the position of the gaze of the user of the wearable device 103 and information on the range (e.g., range 401 of FIG. 9A) recognizable by the user. For example, the FoV information and the gaze information may include an image.

In operation 1220, the external electronic device 570 may identify the FoV of the wearable device with respect to the gaze. For example, the external electronic device 570 may identify the FoV of the wearable device 103 with respect to the gaze, based on the FoV information and the gaze information. Accordingly, the external electronic device 570 may identify (or detect) a first area 410 (e.g., the first area 410 of FIG. 9A) based on the gaze and a second area 420 (e.g., the second area 420 of FIG. 9A) of the FoV.

In operation 1230, the external electronic device 570 may identify a recognition area outside of the FoV. For example, the external electronic device 570 may obtain information on the periphery of the external electronic device 570 through a sensor 573 and a communication circuit 571. Information on the periphery of the external electronic device 570 may be referred to as information on the periphery of the vehicle. For example, the external electronic device 570 may identify the area (i.e., the recognition area) (e.g., the area 930 in FIG. 9A) recognizable by the external electronic device 570 based on information on the periphery.

The external electronic device 570 may map the first area, the second area, and the recognition area. For example, the external electronic device 570 may synchronize the first area, the second area, and the recognition area. For example, the first area and the second area may be included within a wind shield (e.g., the wind shield 910 in FIG. 9A) of the external electronic device 570. While the user is driving, the first area and the second area may be positioned within the wind shield positioned in front of the external electronic device 570. However, an embodiment of the present disclosure is not limited thereto.

In operation 1240, the external electronic device 570 may provide notification for the object and transmit, to the wearable device 103, the signal indicating a display of a visual object for notifying the object. For example, the external electronic device 570 may, based on identifying the object associated with a context representing a situation of the user, provide notification for the object. Also, the external electronic device 570 may, based on identifying the object associated with the context representing the situation of the user, transmit the signal to the wearable device 103.

The external electronic device 570 may identify the context representing the situation of the user and the object associated with the context. For example, the context may define an action or the situation of the user. For example, the context may be referred to as a routine, situation information, or a behavior pattern. For example, the context may be defined so that the wearable device 103 interprets the behavior or the situation of the user and provides information or service needed by the user.

The external electronic device 570 may identify the context by obtaining information on the context identified by the wearable device 103. However, an embodiment of the present disclosure is not limited thereto. For example, the external electronic device 570 may identify the context of the user based on the information on the periphery obtained by the external electronic device 570 through the sensor 573 and the communication circuit 571.

The external electronic device 570 may identify the object by receiving information on the object from the wearable device 103. However, an embodiment of the present disclosure is not limited thereto. For example, the external electronic device 570 may identify the object based on the information on the periphery obtained by the external electronic device 570 through the sensor 573 and the communication circuit 571.

The external electronic device 570 may identify the position of the object associated with the context. For example, the external electronic device 570 may identify that the position of the object is positioned outside of the FoV and within the recognition area.

The external electronic device 570 may provide notification for the object based on identifying the position within the recognition area. For example, the notification may include at least one of the visual object represented through the display on the wind shield, vibration by a handle of the vehicle, the visual object represented through another display disposed in the vehicle, movement of a seat in which the user is positioned in the vehicle, or acoustic provided through a speaker of the vehicle. For example, the display on the wind shield may include a head up display (HUD). For example, the other display disposed in the vehicle may include the display including a dashboard of the vehicle or the display for adjusting setting of the vehicle.

According to an embodiment, based on identifying the position within the recognition area, the external electronic device 570 may transmit, to the wearable device 103, a signal indicating the display of the visual object for notifying the object. For example, the signal may indicate displaying the visual object for notifying the object positioned within the recognition area in partial area of the FoV of the wearable device 103. The wearable device 103 may display the object in the partial area based on receiving the signal. For example, the wearable device 103 may provide a third visual effect (e.g., the third visual effect 840 of FIG. 8A). For example, the third visual effect may include a rendered image corresponding to the object.

As described above, a wearable device may comprise a display. The wearable device may comprise a sensor. The wearable device may comprise a communication circuit. The wearable device may comprise memory, including one or more storage mediums, storing instructions. The wearable device may comprise at least one processor comprising processing circuitry. The instructions, when executed by the at least one processor individually or collectively, may cause the wearable device to, identify a context representing a situation of a user worn by the wearable device based on information obtained through the sensor and the communication circuit. The instructions, when executed by the at least one processor individually or collectively, may cause the wearable device to, identify a position of an object associated with the context based on the information. The instructions, when executed by the at least one processor individually or collectively, may cause the wearable device to, display a first visual object, which is at least partially superimposed on with respect to the object, superimposed on a periphery of the object based on verifying that the object is positioned within a first area corresponding to a gaze direction of the user in a field of view (FoV) area of the wearable device. The instructions, when executed by the at least one processor individually or collectively, may cause the wearable device to, display by blinking the first visual object which is at least partially superimposed on with respect to the object based on verifying that the object is positioned within a second area excluding the first area in the FoV area. The instructions, when executed by the at least one processor individually or collectively, may cause the wearable device to, display a second visual object representing the object on a point in the FoV area based on verifying that the object is positioned within a third area outside of the FoV area.

According to an embodiment, the information obtained through the sensor and the communication circuit may include at least one of an image of an area around the wearable device, acoustic information, information on an external electronic device connected based on short-range wireless communication, biometric information of the user, or movement information of the user.

According to an embodiment, the instructions, when executed by the at least one processor individually or collectively, may cause the wearable device to identify the context representing the situation of the user based on an executing software application and the information. The instructions, when executed by the at least one processor individually or collectively, may cause the wearable device to identify the object associated with the context based on the information.

According to an embodiment, the instructions, when executed by the at least one processor individually or collectively, may cause the wearable device to identify the gaze direction in which a gaze of the user indicates. The instructions, when executed by the at least one processor individually or collectively, may cause the wearable device to display, through the display, at least one calibration object displayed adjacent to the gaze direction. The instructions, when executed by the at least one processor individually or collectively, may cause the wearable device to identify the first area based on input of the user for the at least one calibration object.

According to an embodiment, the instructions, when executed by the at least one processor individually or collectively, may cause the wearable device to identify a movement of the user based on the information. The instructions, when executed by the at least one processor individually or collectively, may cause the wearable device to identify a size of the first area as a first size based on the movement having a first moving speed. The instructions, when executed by the at least one processor individually or collectively, may cause the wearable device to identify the size of the first area as a second size smaller than the first size based on the movement having a second moving speed faster than the first moving speed.

According to an embodiment, the instructions, when executed by the at least one processor individually or collectively, may cause the wearable device to identify a size of pupil of the user based on the information. The instructions, when executed by the at least one processor individually or collectively, may cause the wearable device to identify a size of the first area as a first size based on the pupil having a first pupil size. The instructions, when executed by the at least one processor individually or collectively, may cause the wearable device to identify the size of the first area as a second size smaller than the first size based on a second pupil size bigger than the first pupil size.

According to an embodiment, the instructions, when executed by the at least one processor individually or collectively, may cause the wearable device to perform hand tracking for the user based on the information. The instructions, when executed by the at least one processor individually or collectively, may cause the wearable device to identify a portion area corresponding to a hand of the user within the first area based on the hand tracking. The instructions, when executed by the at least one processor individually or collectively, may cause the wearable device to refrain from displaying of the first visual object with respect to the object based on identifying the position within the portion area.

According to an embodiment, the first visual object may include a line having a designated thick representing the periphery of the object. The second visual object may include an image rendered the object. The point in the FoV area may represent a portion of the FoV area adjacent to the third area.

According to an embodiment, the third area may include an area recognizable by the wearable device based on the information.

According to an embodiment, the instructions, when executed by the at least one processor individually or collectively, may cause the wearable device to display a text describing the object on another point in the FoV area while displaying the second visual object representing the object based on verifying that the object is positioned within the third area. The another portion may include the first area and the second area.

According to an embodiment, the instructions, when executed by the at least one processor individually or collectively, may cause the wearable device to output a voice, which utters a text describing the object, through a speaker of the wearable device while displaying the second visual object representing the object based on verifying that the object is positioned within the third area.

According to an embodiment, the instructions, when executed by the at least one processor individually or collectively, may cause the wearable device to identify a priority for the object based on the context. The instructions, when executed by the at least one processor individually or collectively, may cause the wearable device to display a text describing the object on another point of the FoV area based on the object having the priority higher than or equal to a reference level. The priority may represent urgency of the object. The another point may include the first area.

According to an embodiment, the instructions, when executed by the at least one processor individually or collectively, may cause the wearable device to blink the first visual object during a designated time based on verifying that the object is positioned within the second area or the third area. The instructions, when executed by the at least one processor individually or collectively, may cause the wearable device to change a brightness of the second area in response to verifying that the object is positioned within the second area or the third area after the first visual object blinks during the designated time.

According to an embodiment, the instructions, when executed by the at least one processor individually or collectively, may cause the wearable device to transmit, to an external electronic device, a signal requesting an execution of a function of the external electronic device for adjusting the position within the first are based on verifying that the object is positioned within the second area or the third area.

According to an embodiment, the object may include an IoT (internet of things) device. The instructions, when executed by the at least one processor individually or collectively, may cause the wearable device to connect to a server managing the IoT device through the communication circuit. The instructions, when executed by the at least one processor individually or collectively, may cause the wearable device to receive, from the server, information on the IoT device. The instructions, when executed by the at least one processor individually or collectively, may cause the wearable device to identify whether the position of the object is within a space in which the wearable device is positioned based on the information on the IoT device. The instructions, when executed by the at least one processor individually or collectively, may cause the wearable device to display the second visual object on the point of the FoV area based on identifying the position within the third area in case that the position is within the space.

According to an embodiment, the instructions, when executed by the at least one processor individually or collectively, may cause the wearable device to display the second visual object together with an image representing another space included the position of the object on the portion of the Field of View (FoV) in case that the position is outside the space.

As described above, a method performed by a wearable device may comprise identifying a context representing a situation of a user worn by the wearable device based on information obtained through a sensor and a communication circuit of the wearable device. The method may comprise identifying a position of an object associated with the context based on the information. The method may comprise displaying a first visual object, which is at least partially superimposed on with respect to the object, superimposed on a periphery of the object based on verifying that the object is positioned within a first area corresponding to a gaze direction of the user in a field of view (FoV) area of the wearable device. The method may comprise displaying by blinking the first visual object which is at least partially superimposed on with respect to the object based on verifying that the object is positioned within a second area excluding the first area in the FoV area. The method may comprise displaying a second visual object representing the object on a point in the FoV area based on verifying that the object is positioned within a third area outside of the FoV area.

As described above, a non-transitory computer-readable storage medium, when individually or collectively executed by at least one processor of a wearable device comprising a display, a sensor, and a communication circuit, may store one or more programs including instructions that cause to identify a context representing a situation of a user worn by the wearable device based on information obtained through the sensor and the communication circuit. The non-transitory computer-readable storage medium, when individually or collectively executed by the at least one processor may store one or more programs including instructions that cause to identify a position of an object associated with the context based on the information. The non-transitory computer-readable storage medium, when individually or collectively executed by the at least one processor may store one or more programs including instructions that cause to display a first visual object, which is at least partially superimposed on with respect to the object, superimposed on a periphery of the object based on verifying that the object is positioned within a first area corresponding to a gaze direction of the user in a field of view (FoV) area of the wearable device. The non-transitory computer-readable storage medium, when individually or collectively executed by the at least one processor may store one or more programs including instructions that cause to display by blinking the first visual object which is at least partially superimposed on with respect to the object based on verifying that the object is positioned within a second area excluding the first area in the FoV area. The non-transitory computer-readable storage medium, when individually or collectively executed by the at least one processor may store one or more programs including instructions that cause to display a second visual object representing the object on a point in the FoV area based on verifying that the object is positioned within a third area outside of the FoV area.

As described above, a vehicle may comprise a sensor. The vehicle may comprise a communication circuit. The vehicle may comprise memory, including one or more storage mediums, storing instructions. The vehicle may comprise at least one processor comprising processing circuitry. The instructions, when executed by the at least one processor individually or collectively, may cause the vehicle to receive Field of View (FoV) information of a wearable device and gaze information of the user, from the wearable device, which is connected through the communication circuit, worn by the user of the vehicle. The instructions, when executed by the at least one processor individually or collectively, may cause the vehicle to identify a Field of View (FoV) of the wearable device with respect to the gaze based on the Field of View (FoV) information and the gaze information. The instructions, when executed by the at least one processor individually or collectively, may cause the vehicle to identify a recognition area of the vehicle outside of the Field of View (FoV) based on information obtained through the sensor and the communication circuit. The instructions, when executed by the at least one processor individually or collectively, may cause the vehicle to, based on identifying an object associated with a context representing a situation of the user within the recognition area, provide notification for the object and transmit, to the wearable device, a signal indicating a display of a visual object for notifying the object.

According to an embodiment, the notification for the object may include at least one of a visual object represented through a display on a wind shield of the vehicle, vibration performed through a handle of the vehicle, a visual object represented through another display disposed in the vehicle, movement of a seat position in the vehicle, or acoustic provided through a speaker of the vehicle.

According to an embodiment, the signal may indicate displaying the visual object for notifying the object positioned within the recognition area on portion of the Field of View (FoV) of the wearable device.

According to an embodiment, the instructions, when executed by the at least one processor individually or collectively, may cause the vehicle to identify a first area based on a gaze of the user and a second area of the FoV distinguished from the first area in the Field of View (FoV) based on the Field of View (FoV) information and the gaze information. The instructions, when executed by the at least one processor individually or collectively, may cause the vehicle to identify the recognition area outside of the Field of View (FoV) based on the information, the first area, and the second area.

As described above, a method performed by a vehicle may comprise receiving Field of View (FoV) information of a wearable device and gaze information of the user, from the wearable device, which is connected through a communication circuit, worn by the user of the vehicle. The method may comprise identifying a Field of View (FoV) of the wearable device with respect to the gaze based on the Field of View (FoV) information and the gaze information. The method may comprise identifying a recognition area of the vehicle outside of the Field of View (FoV) based on information obtained through the sensor and the communication circuit. The method may comprise, based on identifying an object associated with a context representing a situation of the user within the recognition area, provide notification for the object. The method may comprise transmitting, to the wearable device, a signal indicating a display of a visual object for notifying the object.

As described above, a non-transitory computer-readable storage medium, when individually or collectively executed by at least one processor of a vehicle comprising a sensor and a communication circuit, may store one or more programs including instructions that cause to receive Field of View (FoV) information of a wearable device and gaze information of the user, from the wearable device, which is connected through the communication circuit, worn by the user of the vehicle. The non-transitory computer-readable storage medium, when individually or collectively executed by the at least one processor may store one or more programs including instructions that cause to identify a Field of View (FoV) of the wearable device with respect to the gaze based on the Field of View (FoV) information and the gaze information. The non-transitory computer-readable storage medium, when individually or collectively executed by the at least one processor may store one or more programs including instructions that cause to identify a recognition area of the vehicle outside of the Field of View (FoV) based on information obtained through the sensor and the communication circuit. The non-transitory computer-readable storage medium, when individually or collectively executed by the at least one processor may store one or more programs including instructions that cause to, based on identifying an object associated with a context representing a situation of the user within the recognition area, provide notification for the object and transmit, to the wearable device, a signal indicating a display of a visual object for notifying the object.

The electronic device according to one or more embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. The electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may be interchangeably used with other terms, for example, "logic", "logic block", "part", or "circuit". A module may be a single integral component, or a minimum unit or part thereof, adapted to perform one or more functions. For example, according to an example, the module may be implemented in a form of an application-specific integrated circuit (ASIC).

One or more embodiments as set forth herein may be implemented as software (e.g., a program 140) including one or more instructions that are stored in a storage medium (e.g., an internal memory 136 or an external memory 138) that is readable by a machine (e.g., an electronic device 101). For example, a machine (e.g., a processor 120 of an electronic device 101) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments of the disclosure, each component (e.g., a module or a program) of the above-described components may include a single entity or multiple entities, and some of the multiple entities may be separately disposed in different components. According to one or more embodiments of the disclosure, one or more of the above-described components may be omitted, or one or more other components may be added. Alternatively or additionally, a plurality of components (e.g., modules or programs) may be integrated into a single component. In such a case, according to one or more embodiments of the disclosure, the integrated component may still perform one or more functions of each of the plurality of components in the same or similar manner as they are performed by a corresponding one of the plurality of components before the integration. According to one or more embodiments of the disclosure, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means".

What is claimed is:

1. A wearable device comprising:
a display;
a sensor;
a camera;
a communication circuit;
memory, including one or more storage mediums, storing instructions; and
at least one processor comprising processing circuitry,
wherein the instructions, when executed by the at least one processor individually or collectively, cause the wearable device to:
obtain, through the camera, an image representing an external environment of the wearable device, wherein the external environment includes a plurality of objects;
identify a context representing a situation of a user worn by the wearable device based on information obtained through the sensor and the communication circuit;
identify a position of an object associated with the identified context among the plurality of objects;
display a first visual object, which is at least partially superimposed on the object based on verifying that the object is positioned within a first area corresponding to a gaze direction of the user in a field of view (FoV) area of the wearable device;
display by blinking the first visual object based on verifying that the object is positioned within a second area excluding the first area in the FoV area; and
display a second visual object representing the object on a point in the FoV area based on verifying that the object is positioned within a third area outside of the FoV area.

2. The wearable device of claim 1,
wherein the information obtained through the sensor and the communication circuit includes at least one of acoustic information, information on an external electronic device connected based on short-range wireless communication, biometric information of the user, or movement information of the user,
wherein the instructions, when executed by the at least one processor individually or collectively, cause the wearable device to:

identify the context representing the situation of the user based on an executing software application and the information; and
identify the object associated with the context based on the information.

3. The wearable device of claim 1,
wherein the instructions, when executed by the at least one processor individually or collectively, cause the wearable device to:
identify the gaze direction in which a gaze of the user indicates;
display, through the display, at least one calibration object displayed adjacent to the gaze direction; and
identify the first area based on input of the user for the at least one calibration object.

4. The wearable device of claim 1,
wherein the instructions, when executed by the at least one processor individually or collectively, cause the wearable device to:
identify a movement of the user based on the information;
identify a size of the first area as a first size based on the movement having a first moving speed; and
identify the size of the first area as a second size smaller than the first size based on the movement having a second moving speed faster than the first moving speed.

5. The wearable device of claim 1,
wherein the instructions, when executed by the at least one processor individually or collectively, cause the wearable device to:
identify a size of pupil of the user based on the information;
identify a size of the first area as a first size based on the pupil having a first pupil size; and
identify the size of the first area as a second size smaller than the first size based on a second pupil size bigger than the first pupil size.

6. The wearable device of claim 1,
wherein the instructions, when executed by the at least one processor individually or collectively, cause the wearable device to:
perform hand tracking for the user based on the information;
identify a portion area corresponding to a hand of the user within the first area based on the hand tracking; and
refrain from displaying of the first visual object with respect to the object based on identifying the position within the portion area.

7. The wearable device of claim 1,
wherein the first visual object includes a line at a periphery of the object,
wherein the second visual object includes an image rendered based on the object,
wherein the point in the FoV area represents a portion of the FoV area adjacent to the third area, and
wherein the third area includes an area recognizable by the wearable device based on the information.

8. The wearable device of claim 1,
wherein the instructions, when executed by the at least one processor individually or collectively, cause the wearable device to:
display a text describing the object on another point in the FoV area while displaying the second visual object representing the object based on verifying that the object is positioned within the third area,
wherein another portion includes the first area and the second area.

9. The wearable device of claim 1,
wherein the instructions, when executed by the at least one processor individually or collectively, cause the wearable device to:
output a voice, which utters a text describing the object, through a speaker of the wearable device while displaying the second visual object representing the object based on verifying that the object is positioned within the third area.

10. The wearable device of claim 1,
wherein the instructions, when executed by the at least one processor individually or collectively, cause the wearable device to:
identify a priority for the object based on the context; and
display a text describing the object on another point of the FoV area based on the object having the priority higher than or equal to a reference level,
wherein the priority represents urgency of the object, and
wherein the another point includes the first area.

11. The wearable device of claim 1,
wherein the instructions, when executed by the at least one processor individually or collectively, cause the wearable device to:
blink the first visual object during a designated time based on verifying that the object is positioned within the second area or the third area; and
change a brightness of the second area in response to verifying that the object is positioned within the second area or the third area after the first visual object blinks during the designated time.

12. The wearable device of claim 1,
wherein the instructions, when executed by the at least one processor individually or collectively, cause the wearable device to:
transmit, to an external electronic device, a signal requesting an execution of a function of the external electronic device for adjusting the position within the first are based on verifying that the object is positioned within the second area or the third area.

13. The wearable device of claim 1,
wherein the object includes an IoT (internet of things) device,
wherein the instructions, when executed by the at least one processor individually or collectively, cause the wearable device to:
connect to a server managing the IoT device through the communication circuit,
receive, from the server, information on the IoT device;
identify whether the position of the object is within a space in which the wearable device is positioned based on the information on the IoT device; and
display the second visual object on the point of the FoV area based on identifying the position within the third area in case that the position is within the space.

14. A method performed by a wearable device comprising:
obtaining, through a camera of the wearable device, an image representing an external environment of the wearable device. wherein the external environment includes a plurality of objects;
identifying a context representing a situation of a user worn by the wearable device based on information obtained through a sensor and a communication circuit of the wearable device;
identifying a position of an object associated with the identified context among the plurality of objects;

displaying a first visual object, which is at least partially superimposed on the object based on verifying that the object is positioned within a first area corresponding to a gaze direction of the user in a field of view (FoV) area of the wearable device;

displaying by blinking the first visual object based on verifying that the object is positioned within a second area excluding the first area in the FoV area; and displaying a second visual object representing the object on a point in the FoV area based on verifying that the object is positioned within a third area outside of the FoV area.

15. The method of claim 14, wherein the information obtained through the sensor and the communication circuit includes at least one of acoustic information, information on an external electronic device connected based on short-range wireless communication, biometric information of the user, or movement information of the user, wherein the method comprises:
  identifying the context representing the situation of the user based on an executing software application and the information; and
  identifying the object associated with the context based on the information.

16. The method of claim 14, the method comprising:

identifying the gaze direction in which a gaze of the user indicates;

displaying at least one calibration object displayed adjacent to the gaze direction; and identifying the first area based on input of the user for the at least one calibration object.

17. The method of claim 14, the method comprising:

identifying a movement of the user based on the information;

identifying a size of the first area as a first size based on the movement having a first moving speed; and identifying the size of the first area as a second size smaller than the first size based on the movement having a second moving speed faster than the first moving speed.

18. The method of claim 14, the method comprising:

identifying a size of pupil of the user based on the information;

identifying a size of the first area as a first size based on the pupil having a first pupil size; and identifying the size of the first area as a second size smaller than the first size based on a second pupil size bigger than the first pupil size.

19. A non-transitory computer-readable storage medium, when individually or collectively executed by at least one processor of a wearable device comprising a display, a sensor, a camera, and a communication circuit, stores one or more programs including instructions that cause to:

obtain, through the camera, an image representing an external environment of the wearable device, wherein the external environment includes a plurality of objects:

identify a context representing a situation of a user worn by the wearable device based on information obtained through the sensor and the communication circuit;

identify a position of an object associated with the identified context among the plurality of objects;

display a first visual object, which is at least partially superimposed on the object based on verifying that the object is positioned within a first area corresponding to a gaze direction of the user in a field of view (FoV) area of the wearable device;

display by blinking the first visual object based on verifying that the object is positioned within a second area excluding the first area in the FoV area; and display a second visual object representing the object on a point in the FoV area based on verifying that the object is positioned within a third area outside of the FoV area.

20. The non-transitory computer-readable storage medium of claim 19, wherein the information obtained through the sensor and the communication circuit includes at least one of acoustic information, information on an external electronic device connected based on short-range wireless communication, biometric information of the user, or movement information of the user, wherein the non-transitory computer-readable storage medium, when individually or collectively executed by the at least one processor, stores one or more programs including instructions that cause to
  identify the context representing the situation of the user based on an executing software application and the information; and
  identify the object associated with the context based on the information.

* * * * *